(12) United States Patent
Hess et al.

(10) Patent No.: US 11,199,285 B2
(45) Date of Patent: Dec. 14, 2021

(54) PLUG-TYPE CONNECTOR FOR MEDIA LINES

(71) Applicant: VOSS AUTOMOTIVE GMBH, Wipperfürth (DE)

(72) Inventors: Jochem-Andreas Hess, Wipperfürth (DE); Eugen Heinrichs, Bergneustadt (DE); Alexander Oberdörfer, Radevormwald (DE); Sascha Rosenfeldt, Wipperfürth (DE); Lukas Röhrig, Marienheide (DE)

(73) Assignee: VOSS Automotive GmbH, Wipperfurth (DE)

( * ) Notice: Subject to any disclaimer, the term of this patent is extended or adjusted under 35 U.S.C. 154(b) by 699 days.

(21) Appl. No.: 15/770,069

(22) PCT Filed: Oct. 19, 2016

(86) PCT No.: PCT/EP2016/075016
§ 371 (c)(1),
(2) Date: Apr. 20, 2018

(87) PCT Pub. No.: WO2017/067950
PCT Pub. Date: Apr. 27, 2017

(65) Prior Publication Data
US 2018/0313488 A1 Nov. 1, 2018

(30) Foreign Application Priority Data

Oct. 21, 2015 (DE) .................... 10 2015 117 966.0
May 17, 2016 (DE) .................... 10 2016 109 051.4

(51) Int. Cl.
*F16L 53/38* (2018.01)
*F16L 37/088* (2006.01)
(Continued)

(52) U.S. Cl.
CPC .......... *F16L 53/38* (2018.01); *F16L 37/0885* (2019.08); *F16L 37/144* (2013.01); *F16L 53/35* (2018.01); *F16L 25/01* (2013.01); *F16L 2201/10* (2013.01)

(58) Field of Classification Search
CPC ....... F16L 53/38; F16L 37/0885; F16L 53/35; F16L 37/144; F16L 25/01; F16L 2201/10; F16L 37/088
(Continued)

(56) References Cited

U.S. PATENT DOCUMENTS 6,702,335 B2    3/2004 Bahner et al.
2013/0082459 A1*    4/2013 Kaneko ................. F16L 37/144
                                                                    285/93

FOREIGN PATENT DOCUMENTS

CA    2584002 A1 *    4/2006    ............ F16L 37/144
DE    2444993 A1    4/1976
(Continued)

*Primary Examiner* — James M Hewitt, II
(74) *Attorney, Agent, or Firm* — Eric J. Sosenko; Jonathan P. O'Brien; Honigman LLP

(57) ABSTRACT

A plug-type connector for media lines having a coupling part into which a plug part can be inserted. The plug part can be retainingly engaged in the coupling part by a retaining clip that has at least two pairs of spring arms. The clip can be premounted on the coupling part by latching of the spring arms. The clip is U-shaped wherein legs of the U-shape form the two pairs of spring arms, which pairs are arranged one behind the other in the longitudinal direction and are separated by a slot and are elastic in the radial and axial directions. The first pair of the spring arms interlockingly blocks the plug part against being pulling out of the coupling part, and the second pair of spring arms holds the retaining clip captively in the coupling part in pre-assembly and assembly positions.

18 Claims, 15 Drawing Sheets

(51) Int. Cl.
*F16L 37/14* (2006.01)
*F16L 53/35* (2018.01)
*F16L 25/01* (2006.01)

(58) Field of Classification Search
USPC .................................................. 285/319, 321
See application file for complete search history.

(56) References Cited

FOREIGN PATENT DOCUMENTS

| DE | 102004062887 B3 | 10/2005 | |
|---|---|---|---|
| DE | 112008000308 T5 | 12/2009 | |
| DE | 102015104889 A1 | 10/2016 | |
| EP | 1158236 A1 | 11/2001 | |
| EP | 2541118 A1 | 1/2013 | |
| EP | 2722574 A1 | 4/2014 | |
| EP | 2799750 A1 | 11/2014 | |
| FR | 2958004 A1 * | 9/2011 | ............ F16L 37/098 |
| FR | 3072756 A1 * | 4/2019 | .......... F16L 37/0885 |
| JP | 2007255668 A | 10/2007 | |
| JP | 2014209009 A | 11/2014 | |
| WO | WO-2007057068 A1 * | 5/2007 | ............ F16L 37/144 |
| WO | WO-2011105234 A1 * | 9/2011 | .......... F16L 37/0885 |
| WO | 2015/064289 A1 | 5/2015 | |
| WO | 2015/084782 A1 | 6/2015 | |

\* cited by examiner

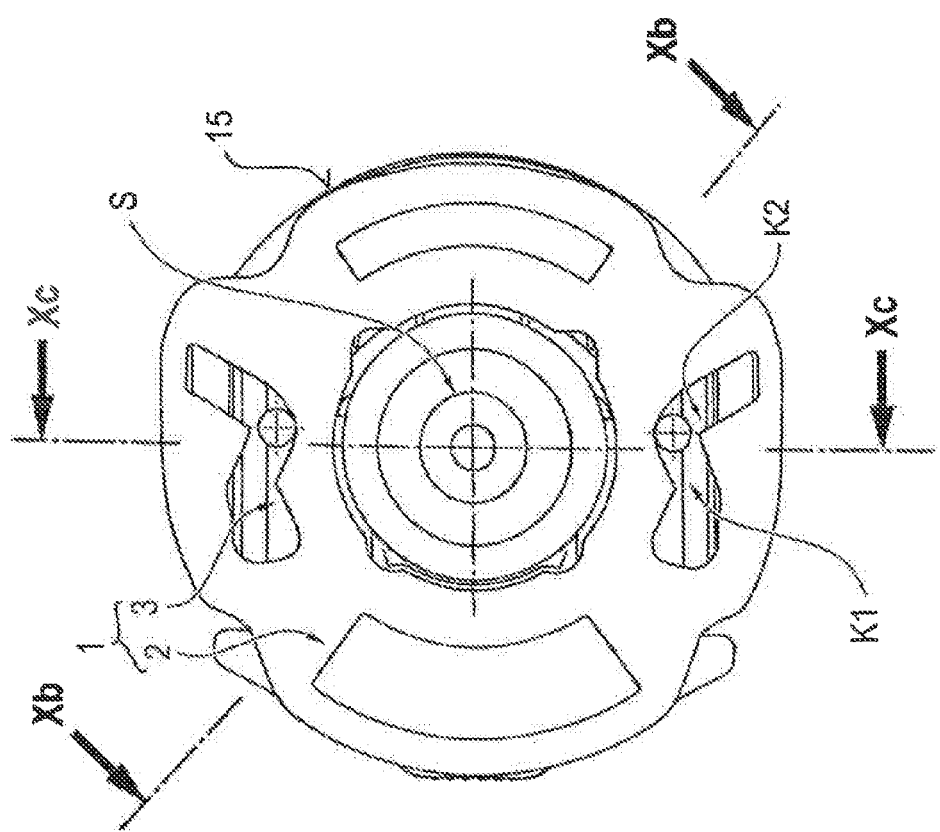

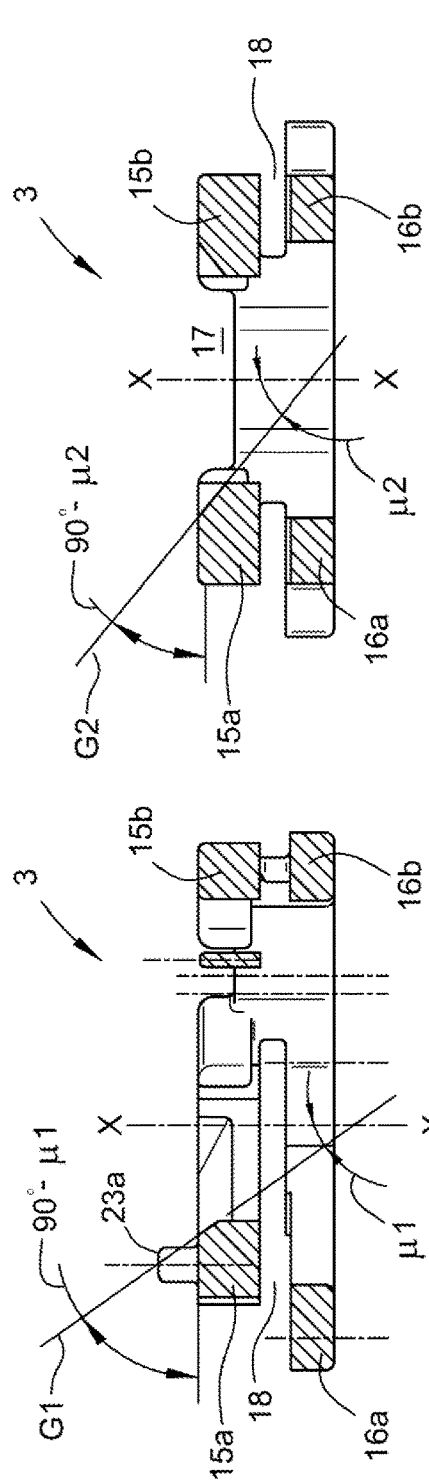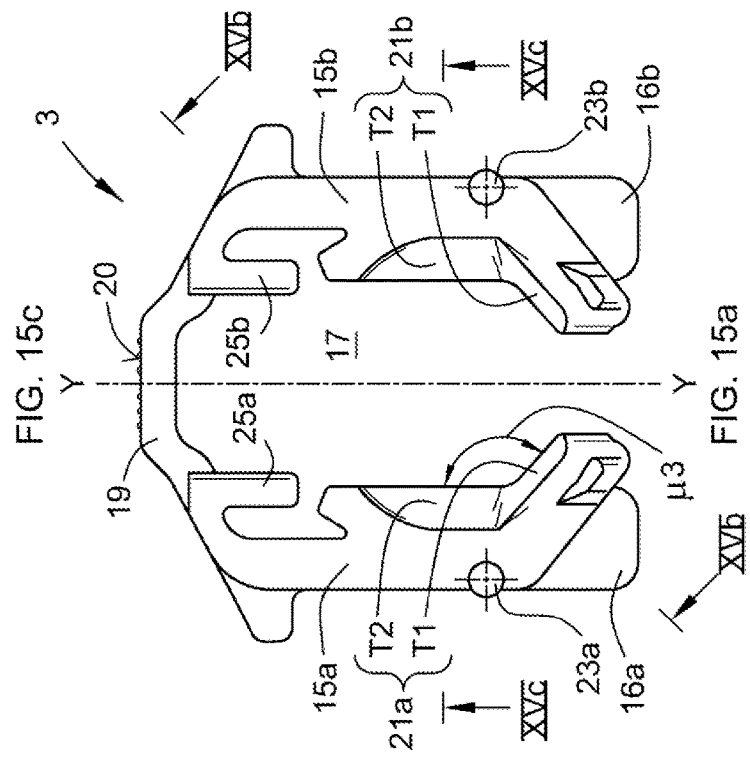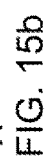
FIG. 15c
FIG. 15a
FIG. 15b

PLUG-TYPE CONNECTOR FOR MEDIA LINES

TECHNICAL FIELD

The invention relates to a plug-type connector for hose and/or pipe connections, including a coupling part having a receiving opening into which a plug part with a plug shaft, which comprises a collar, is insertable in a plug-in direction, and a radially slotted retaining clip, which is resiliently elastic at least in portions, comprises at least two latching arms, is pre-assemblable on the coupling part as a result of radially latching the latching arms with the coupling part and in a pre-assembly position assumes an insertion position for the plug part in which the plug part is insertable through the retaining clip into the receiving opening, and wherein the retaining clip in an assembly position assumes a retaining position for the inserted plug part, in which the plug part with its collar is blockable in the receiving opening in a positive locking manner by means of the retaining clip against being pulled out.

BACKGROUND

Such a plug-type connector is disclosed, for example, in DE 24 44 993 A1. In this case, the retaining clip is realized as a resiliently elastic ring. The ring is interrupted by a radial slot such that two spring arms are formed. The spring arms extend in an outer circular arc which extends over a circular angle which is greater than 180°. The ring is radially latched into a slot-shaped peripheral opening on the coupling part. In this case, peripheral grooves on the outer periphery and on the inner periphery of the coupling part serve for the axial fastening of the ring in the coupling part. The spring arms, in this case, encompass the outer periphery of the coupling part, the peripheral wall of the coupling part being enclosed between the ring in the interior of the coupling part and the spring arms on the outer periphery of the coupling part. Actuating levers, by means of which the ring can be widened over the spring arms in the radial direction and moved into an insertion position, are mounted on each of the free ends of the spring arms. The resiliently elastic force of the ring holds the ring in the retaining position. A disadvantage of the DE 24 44 993 is, in particular, that the ring cannot be locked in its retaining position. The ring can be opened relatively easily as a result of actuating the actuating elements. This promotes accidental release of the plug-in connection. In addition, it is not possible to ensure with the system whether the plug part is completely plugged into the plug-type connector, i.e. secure against being pulled out, and is correctly blocked. The retaining clip can also be moved into the retaining position when the plug part is only partially plugged in or is not plugged in at all and is consequently not fixed correctly in the plug-type connector by the retaining clip.

Furthermore, straight and angled generic plug-type connectors which are found commercially under the name "VOSS quick connect system 241" are known. Once the retaining clip has been plugged into the coupling part, the connection is initially produced by plugging together the coupling part and the plug part, in particular a male plug realized according to standard SAE J 2044. In this case, the retaining clip engages behind the collar which is realized in the SAE plug contour. The formation of the plug-in connection is then completed by pulling back the plug part. The named quick connect system is used in automobile construction, in particular in fuel systems and in heated and non-heated SCR systems. SCR, in this case, stands for "selective catalytic reduction" and designates a technique for reducing nitrogen oxide in exhaust gases. The SCR method has been used in automotive engineering since its introduction in 2004 in order to lower the nitrogen oxide emissions in diesel vehicles. Using this technology, commercial vehicles are able to meet the Euro 5 emissions standard and passenger vehicles are able to meet the very strict American BIN5 standard and the Euro 6 standard. As a rule, a 32.5 percent aqueous urea solution, which is uniformly designated in the industry as AdBlue, is run in the lines of SCR systems. The composition is controlled in DIN 70070 or ISO 22241-1. The aqueous solution is injected into the exhaust gas system upstream of the SCR catalytic converter, e.g. by means of a dosing pump or injector.

The plug-type connectors of the known system appear in need of improvement on the basis of the same or similar criteria as the plug-type connector according to DE 24 44 993 A1, i.e. the retaining clip can also be moved into the retaining position when the plug part is only partially plugged in or is not plugged in at all and is consequently not fixed correctly in the plug-type connector by the retaining clip. The retaining clip can also possibly be jammed or tilted in the coupling part when the coupling part is plugged-in.

In order to remedy this, German patent application 10 2015 104 889 has already proposed arranging a separate locking element on the coupling part which is movable in the direction of the center axis of the plug-type connector transversely to the plug-in direction of the plug part from a release position into a locking position and in the release position releases a movement of the retaining clip from the retaining position into the insertion position and in the locking position locks the retaining clip in the retaining position against a movement into the insertion position. In this connection, the increased assembly safety is bought by an increase in the number of components, which is not necessarily to be seen as advantageous.

SUMMARY

The object underlying the invention is to provide a plug-type connector of the type mentioned in the introduction in a less expensive manner, where both the pre-assembly operation of the retaining clip and the assembly and disassembly operation of the plug part is improved. In this case, it should also be possible, in particular, to secure the retaining clip against loss.

The object is achieved by providing that the basic shape of the retaining clip—when viewed in the direction of the longitudinal axis—is realized in a U-shaped manner, wherein the legs of the U realize two pairs of latching arms, which are located diametrically opposite one another and are arranged one behind the other in the axial direction, are each separated from one another by a slot and are resiliently elastic in both the radial and the axial direction, wherein the first pair of latching arms blocks the plug part in the retaining position in a positive locking manner against being pulled out and the second pair of latching arms holds the retaining clip in a captive manner in the coupling part both in the pre-assembly position and in the assembly position.

By the latching arms, which are arranged one behind the other in the axial direction and are each separated from one another by a slot, being resiliently elastic in the axial direction, they are able to be pressed together in a simple manner for the pre-assembly of the retaining clip in the coupling part when the retaining clip is inserted into the coupling part. As a result, tilting and/or jamming of the retaining clip in the coupling part is avoided.

As, according to the invention, the latching arms spring or the spring arms latch, the terms "latching arm" and "spring arm" are used synonymously in the application.

The entire retaining clip, in this case, can be realized in one piece in a construction that is simple to manufacture, in particular advantageously as an injection molded part consisting of plastics material, it being possible to realize it similarly to the ring disclosed in the prior art, by the basic shape of the retaining clip—when viewed in the direction of the longitudinal axis—being realized, in particular, in a U-shaped manner. In this case, the legs of the U, in contrast to the prior art, do not realize just one pair but two pairs of spring arms which are located diametrically opposite one another, i.e. a total of four, instead of two spring arms as is known. The pairs of spring arms are arranged, in this case, one behind the other in the axial direction and the spring arms which are located axially one behind the other are separated in each case by a slot. As a result, the spring arms which are located one behind another are able to be pressed together—as already mentioned—in the axial direction during the pre-assembly of the retaining clip and also for disassembly.

The pairs of spring arms which are located one behind the other fulfill different functions in this case. The pair which faces the plug-in direction of the plug part in the axial direction serves predominantly for fulfilling the main function of producing a connection, that is to say as latching arms for the radial latching of the plug part, whilst the pair which faces away from the plug-in direction of the plug part in the axial direction serves for fulfilling the secondary function according to the invention of locking the retaining clip in its insertion position and in its retaining position so that it is captive.

However, the pair of spring arms which faces the plug-in direction of the plug part in the axial direction can also contribute to fulfilling the secondary functions according to the invention, as is described in more detail below.

For locking the retaining clip, cams with tips which are directed inwardly toward one another are situated in a preferred manner on each of the spring arms of the second pair of spring arms, which, in the insertion position and in the retaining position of the retaining clip, faces away from an end wall of the coupling part, which faces the plug-in direction of the plug part, on the free ends of the spring arms. When the retaining clip is inserted radially into the coupling part for pre-assembly, by means of inclined surfaces which are preferably situated on the cams of the rear spring arms, the rear spring arms can be pressed apart from one another and deflected radially by such an amount that they slide past on both sides of a blocking element of the coupling part and can then, after springing radially inward, engage behind the coupling part. An additional locking part is not necessary in this case.

The blocking element of the coupling part can comprise complementary retaining contours for interaction with the cams of the second spring pair. The retaining contours, together with the cams, form releasable blocking means which block a return movement of the retaining clip, both when the pre-assembly position and also when the final assembly position of the plug-type connector according to the invention is present, therefore when the retaining clip is situated in its retaining position. The retaining contours can advantageously also be realized on the blocking element, on both sides of the same as retaining projections. By the retaining projections being engaged behind by the cams, a movement possible previously transversely with respect to and in opposition to the plug-in direction of the plug part is prevented in a non-positive and positive locking manner. Consequently, the retaining clip is held in a locked manner, it being dimensioned with reference to its length in such a manner that it is able to close off flush with the outer periphery of the coupling part.

The pre-assembly position and the assembly position of the retaining clip can coincide advantageously in the plug-type connector according to the invention, i.e. the retaining clip is aligned coaxially to the axis of the coupling part in both positions—pre-assembly position and assembly position, the retaining clip preferably being able to comprise a clearance for a radial movement in the pre-assembly position. The plug-type connector according to the invention can advantageously be delivered in the pre-assembly state, in which the retaining clip is already mounted on the coupling part and in the receiving opening as a result of radial latching, and which provides the insertion position for the plug part.

The first pair of latching arms, which blocks the plug part in the retaining position in a positive locking manner against being pulled out and is located on a side of the retaining clip that faces the plug-in direction of the plug part when the retaining clip is situated in the insertion position and in the retaining position in the coupling part, can comprise, in particular on a side of the latching arms which faces the plug-in direction of the plug part, in each case inclined surfaces which diverge in opposition to the plug-in direction of the plug part for interaction with the collar of the plug part. The insertion of the plug part into the retaining clip for assembly is made easier as the inclined surfaces act as guide surfaces which center the plug part.

When the plug part is plugged-in, the plug part collar initially contacts the inclined surfaces of the spring arms of the spring clip, which are preferably formed by chamfered regions, the retaining clip—that is to say the spring arms of a pair being widened radially outward in relation to one another as a result of the collar then sliding down along the inclined surfaces and the plug part being able to latch behind the front spring arms, which comprise the inclined surfaces. The spring arms then spring further radially inward and in this way move into their initial position.

In this connection, it can be provided, in particular, that the inclined surfaces are each formed from at least two part-surfaces which are at various divergence angles in opposition to the plug-in direction of the plug part. In each case a first part-surface, which is situated on the free end of the respective latching arm, can comprise, in this case, in an advantageous manner a divergence angle that is smaller than each divergence angle of a second part-surface which is situated in each case in a central region of the latching arm.

The effect of the part-inclined surfaces, in this case, is as follows: The first part-surface pulls the retaining clip in radially prior to its widening, which is significant, in particular, from the point of view of the retaining clip being able to comprise a clearance for a radial movement in the pre-assembly position. For this purpose, the respective first part-surface has to be arranged axially in such a manner in front of the respective second part-surface in the direction of the coupling opening that the collar of the plug part interacts in a significant manner with the first part-surface during insertion—and not yet with the second part-surface. The retaining collar of the plug part therefore first of all contacts the first part-inclined surface, and then when the plug part is moved forward in the plug-in direction comes into contact more and more with the second part-inclined surface. This can be achieved in particular as a result of the first part-surface being at a steeper angle to the center axis than the second part-surface which is situated in the central region. The second part-surface becomes active in this way following the first part-surface and widens the retaining clip radially until in its open position such that the collar of the plug part is able to pass the first latching arm pair axially. The spring arms then spring back radially behind the collar of the plug part and block it against being pulled out. The part-inclined surfaces therefore advantageously break down the integral latching arm movement into consecutive individual movements.

The coupling part can include a basic body, which is realized, in particular, as a sleeve part, and a receiving body for the retaining clip in the basic shape, in particular, of a ring, which basic body and receiving body are connectable together, preferably by means of a substance-to-substance bond, such as by laser welding, or are connected together in the assembled state. Just as the retaining clip, the coupling part or its parts can also be realized in a realization that is simple to manufacture as injection molded parts consisting of plastics material.

A sealing package, which preferably includes two sealing rings, in particular elastomer O-rings, and a spacer ring arranged in between, can be arranged in the coupling part, in particular in the basic body thereof.

In a preferred realization of the plug-type connector according to the invention, guide pins for engagement in complementary guide slots of the coupling part can be situated on each of the spring or latching arms of the pair which, in the insertion position and in the retaining position, faces an end wall of the coupling part which faces the insertion position of the plug part, in particular in a central region of the spring arms.

The end wall facing the insertion direction of the plug part is furthermore also designated as the front end wall and the spring arm pair facing the end wall is designated as the front pair, whilst the end wall of the receiving body for the retaining clip that faces away from the insertion direction of the plug part is furthermore also designated as the rear end wall and the spring arm pair facing the end wall is designated as the rear pair.

As a result of the guide pins of the retaining clip which are located in the slot guide contour of the coupling part, in particular in the retaining clip receiving means thereof formed by the receiving body, and of the longitudinal guide webs of the retaining clip which project into the longitudinal guide region of the retaining clip receiving means, the retaining clip can advantageously be guided during the assembly movement sequence in the plug-type connector according to the invention and secured against rotation about the plug part plug-in axis.

The afore-described arrangement, according to which the inclined surfaces are each formed from at least two part-surfaces which comprise various divergence angles in opposition to the plug-in direction of the plug part, can, in this case in particular, cause the guide pins of the latching arms to move along optimally into the complementary inner guide contour of the slots of the coupling part. Collisions of the cams, in particular with the guide contour, are ruled out as a result, such that the movement which is brought about by the various part-inclined surfaces and initially pulls the retaining clip in radially and then subsequently widens it, also promotes the progression of the integral insertion force during assembly.

In the system named in the introduction, high demands produced from the load conditions are made, in particular, on the heatable fluid lines. The demands relate, in particular, to the possible occurrence of high temperatures which at certain points of the system or of the lines can be, for example, within the range of between 140° C. and 180° C., in the short term even within the range of up to 200° C. Furthermore, the occurrence of high absolute pressures which are within the range of between 5 bar and 10 bar as standard, sometimes even within the range of up to 15 bar, is expected. Pressure pulses can occur which have to be compensated for, as well as also volume changes which are linked, for example, to freezing in the event of frost and to the rethawing of the fluid. The line having a so-called ice compressive strength is mentioned here with reference to the load data. A plug-type connector according to the invention copes with these requirements.

In order to enable heating, the basic body of the coupling part, in this case, can preferably be realized as a connector part which comprises a connection portion for the connection to a fluid line and which comprises a heating portion in which electric heating media can be provided in an arrangement which surrounds the coupling part at least in part. The electric heating media, in particular heating conductors, can be mounted, in this case, on the outside of the coupling part, for which purpose guide elements, in particular helical guide elements, can be arranged or realized on the outer periphery of the coupling part.

In a preferred realization, the coupling part, in particular by means of its receiving body for the retaining clip, can form a housing for the retaining clip which is hollow cylindrical in its basic shape, is closed in each case at the respective end walls of the hollow cylinder and comprises on two sides, which are diametrically opposite one another, peripheral openings for the through-passage of the retaining clip. In the assembled state, the retaining clip, as a result, is advantageously enclosed by the housing at least in regions both in an axial and in a radial direction and is consequently protected against external influences and advantageously also secured against the possibility of a spontaneous opening. The peripheral openings in the coupling part, however, ensure the retaining clip can be assembled and disassembled by allowing or enabling guided radial displaceability of the retaining clip. The opening, on the side on which the retaining clip can be inserted, is designated furthermore as an insertion opening and the opening on the other side is designated as an outlet opening, notwithstanding that the retaining clip does not exit fully through the opening. It is, however, freely accessible on the side—for example for a manual disassembly operation.

It is also preferred when longitudinal guide webs or longitudinal guide steps, which are directed in a secant-like manner, for interaction, in particular for engagement in or for abutment against complementary guides of the coupling part, are situated on each of the spring arms which, in the insertion position and in the retaining position of the retaining clip, face the end wall of the coupling part, which faces the insertion direction of the plug part. Accordingly, guides for the guide webs or guide steps, which are located on the spring arms of the retaining clip, are provided on the coupling part, in particular on the inside on its front end wall which faces the insertion direction of the plug part. The longitudinal guide webs or longitudinal guide steps of the spring arms can be situated, in particular, on both sides of a connecting region or in a connecting region in which the spring arms are connected together or, as an alternative to this, can be arranged on radially inwardly directed projections of the spring arms.

In further advantageous realizations of a plug-type connector according to the invention, a pressure locking system can be provided which prevents the plug-type connector according to the invention—when the plug part is plugged in—and it is under pressure—from being able to be opened or which can prevent—as a result of whatever kind of abovementioned operating loads—the plug part being twisted out of its retaining position.

Further advantageous configurations of the invention will be appreciated from the following description of the figures and the claims.

BRIEF DESCRIPTION OF THE DRAWINGS

The Figures are as Follows:

FIG. 10a shows a front view of a plug-type connector according to the invention at the start of the assembly, FIG. 15a shows a top view of the realization of a retaining clip for the embodiment shown in FIG. 1 of a plug-type connector according to the invention, FIG. 15b shows a section through the embodiment shown in FIG. 15a of a retaining clip according to the invention along the cutting plane XVb-XVb in FIG. 15a, FIG. 15c shows a section through the embodiment shown in FIG. 15a of a retaining clip according to the invention along the cutting plane XVc-XVc in FIG. 15a.

In the various figures of the drawing, identical parts are always provided with the same reference symbols and are consequently, as a rule, only described once below. In terms of better clarity, however, all parts are not designated with their reference symbols in all the figures of the drawing.

DETAILED DESCRIPTION

It is claimed regarding the following description that the invention is not restricted to the exemplary embodiments and, in this case, not to all or multiple features of described feature combinations, rather each individual part-feature of the/each exemplary embodiment, also detached from all the other part-features described in conjunction therewith, is important to the subject matter of the invention in itself and also in combination with arbitrary features of a different exemplary embodiment.

Figure 1:
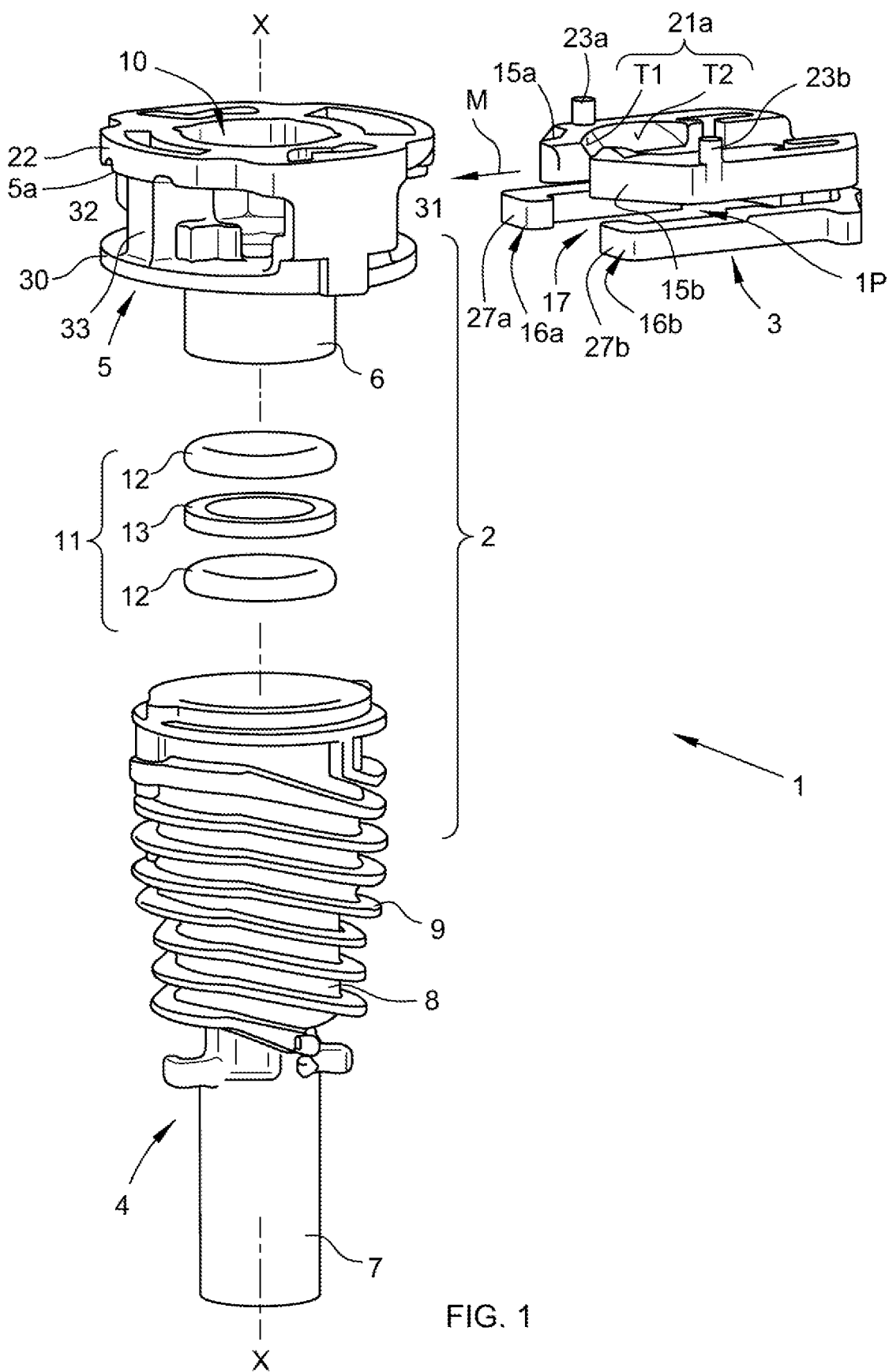
FIG. 1 shows a three-dimensional exploded representation of an embodiment of a plug-type connector according to the invention.

FIG. 1 shows an exploded representation of an advantageous embodiment of a plug-type connector 1 according to the invention for the connection of a plug part S which is realized as a pipe socket, in particular of an SAE J 2044 male plug. Such a plug S is shown initially—together with the plug-type connector 1 according to the invention—in FIG. 2.

The plug-type connector 1 includes a coupling part 2 and a retaining clip 3 which is resiliently elastic, at least in portions.

The coupling part 2 has a basic body 4, which is realized, in particular, as a sleeve part, and a receiving body 5 for the retaining clip 3 in the basic shape, in particular, of a ring, which basic body and receiving body are connectable together, preferably by means of a substance-to-substance bond, such as by laser welding. A connection shoulder 6 is provided for this purpose on the receiving body 5. The basic body 4 and/or the receiving body 5 can be advantageously realized as injection molded parts consisting of plastics material. The receiving body 5 is shown as an individual part in FIGS. 4a and 4b from various viewing angles each in a three-dimensional representation.

The coupling part 2 can be connected at one end, in particular, to a fluid line (not shown). For this purpose, a connection portion 7 is realized on the basic body 4. A media line to be connected can be realized, in particular, as a hose or pipe.

The basic body 4 of the coupling part 2, in this case, in order to enable heating, is realized as a connector part which comprises the connection portion 7 for the connection of the fluid line and a heating portion 8, in which electric heating media—not shown—can be provided in an arrangement which surrounds the coupling part 2 at least in part. The electric heating media, in particular heating conductors, can be fitted, in this case, on the outside of the coupling part 2, for which reason guide elements 9, in particular helical guide elements 9, are arranged or realized on the shell in the region of the heating portion 8 of the coupling part 2.

On the side located opposite the connection portion 7 for the media line, the coupling part 2 comprises a receiving opening 10 for plugging-in the plug part S.

For sealing the plug-in connection, a sealing package 11 is arranged in the coupling part 2, in the basic body 4 thereof. The sealing package 11 preferably includes two O-rings 12 and a spacer ring 13 located in between.

Figure 2:
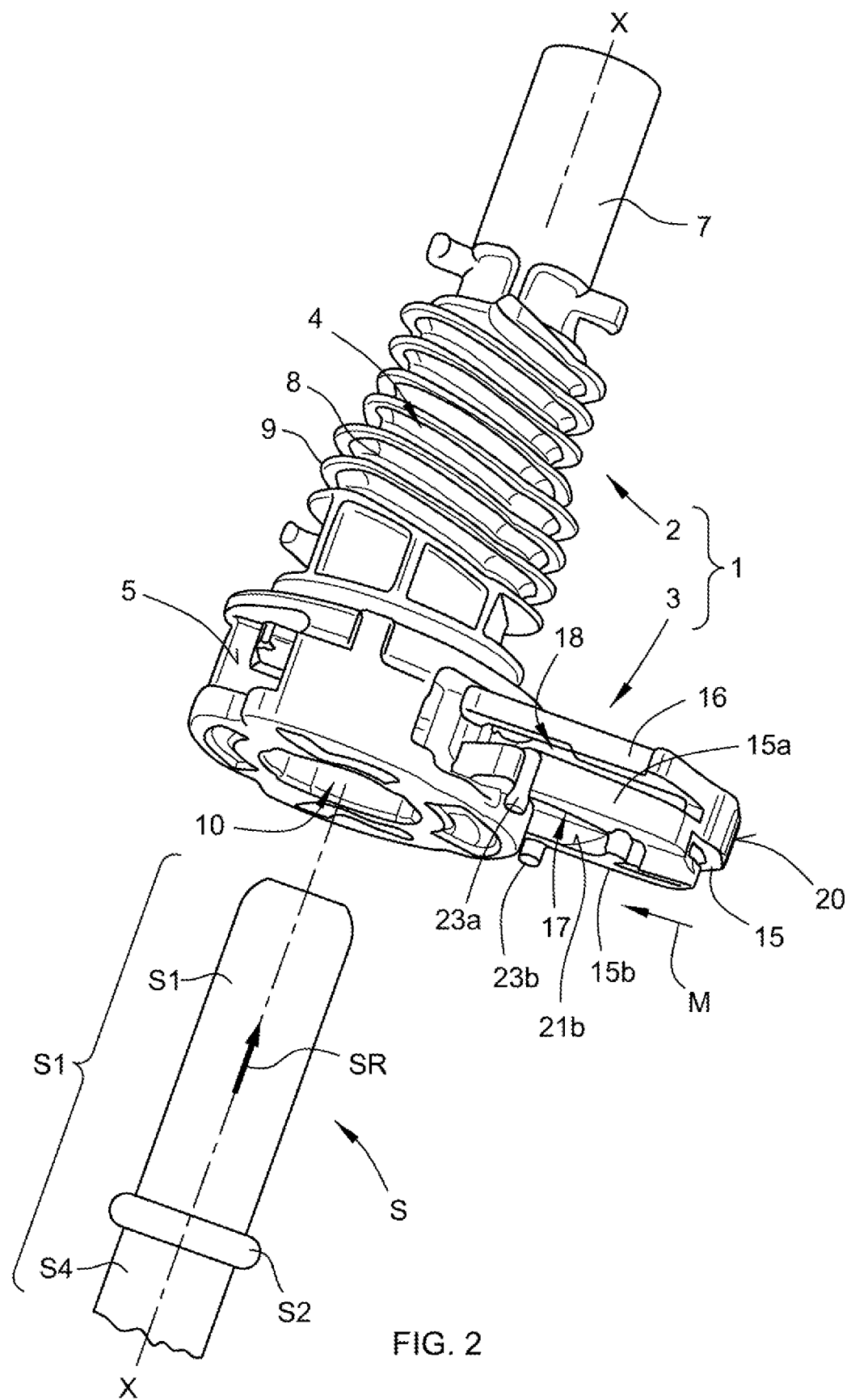
FIG. 2 shows a three-dimensional representation of the embodiment shown in FIG. 1 of a plug-type connector according to the invention with a plug part to be inserted.

As FIG. 2 and also FIGS. 10b and 10c and FIGS. 11a to 11c show in particular, the plug part S comprises a plug-in portion S1, on the outer periphery of which a peripheral collar S2 is arranged. The plug part S is realized in a hollow cylindrical manner. The collar S2 divides the plug-in portion S1 into a sealing portion S3 and a locking portion S4, the sealing portion S3 being arranged axially (longitudinal axis X-X) upstream of the locking portion S4 in the plug-in direction SR. Once the plug S has been plugged-in, the sealing package 11 rests on the sealing portion S3, as is shown, for example, in FIG. 3b.

Figure 8A:
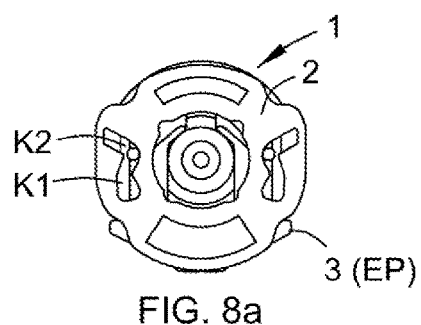
Figure 8B:
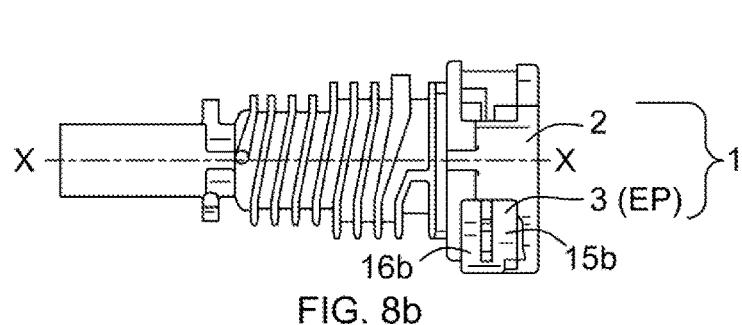
Figure 9:
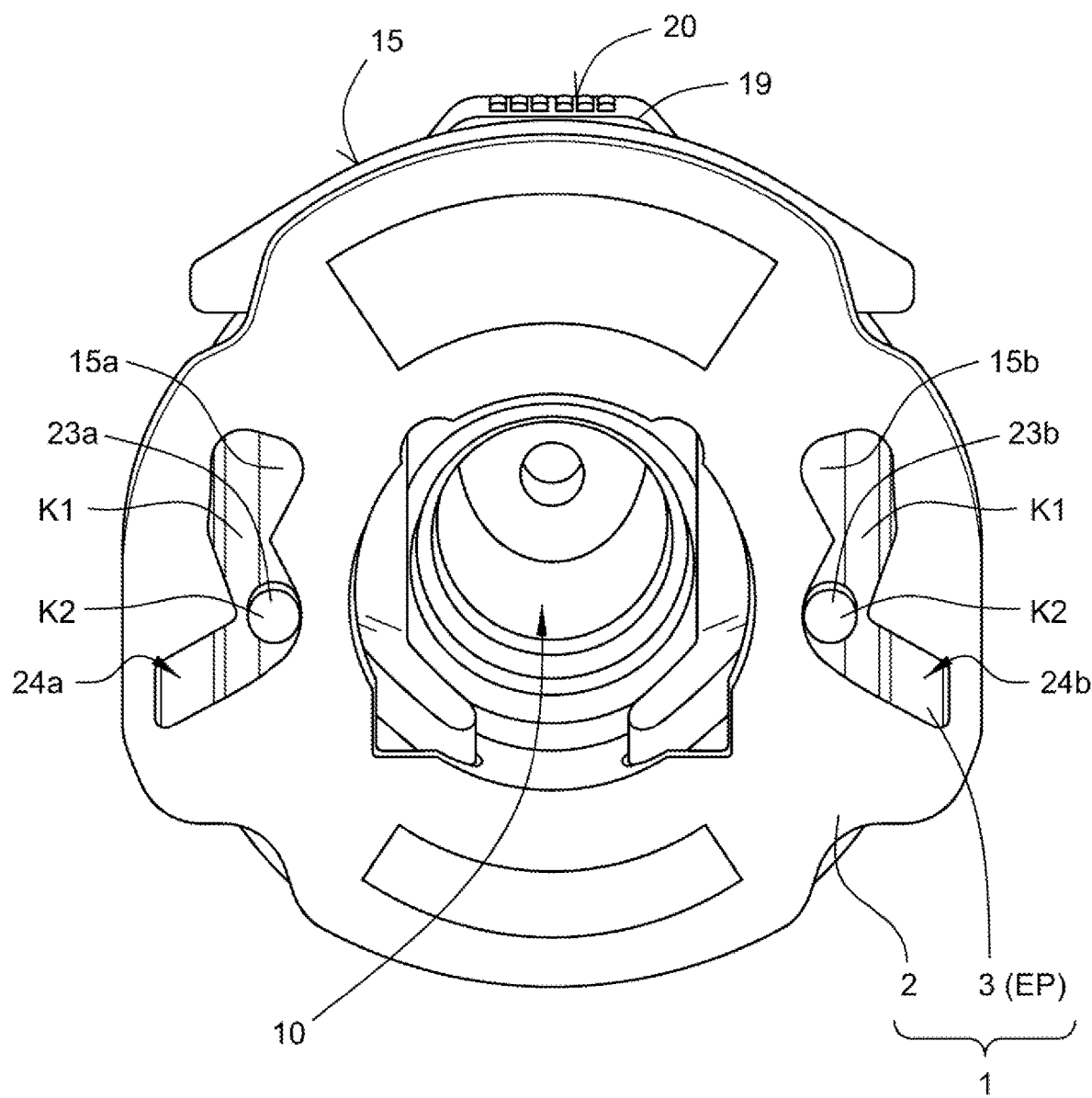
FIG. 9 shows a front view of a plug-type connector according to the invention in the pre-assembly state, corresponding to the representation in FIG. 8a, but enlarged and rotated by 180°.
Figure 11A:
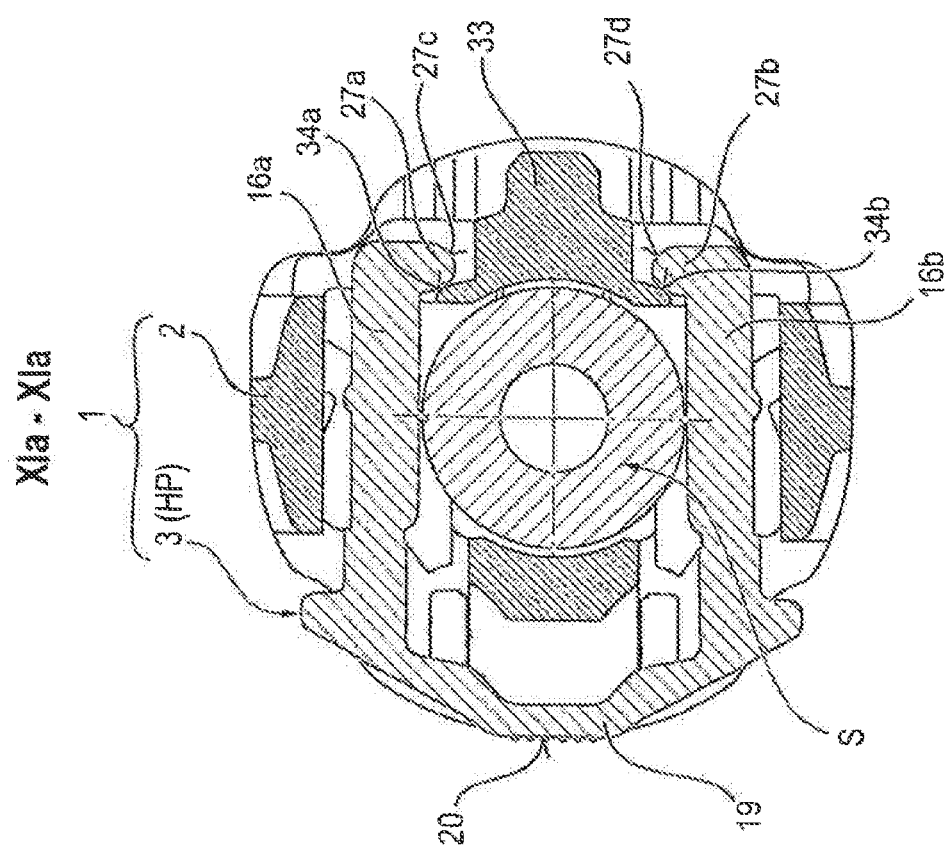
FIGS. 11a, 11b, 11c show a radial section (FIG. 11a: plane XIa-XIa in FIG. 11b), an axial section (FIG. 11b) and a view of the end face (FIG. 11c) of representations of the embodiment shown in FIGS. 2, 5a to 8b and 10a to 10c of a plug-type connector according to the invention in the final assembly state with the plug part inserted.
Figure 11B:
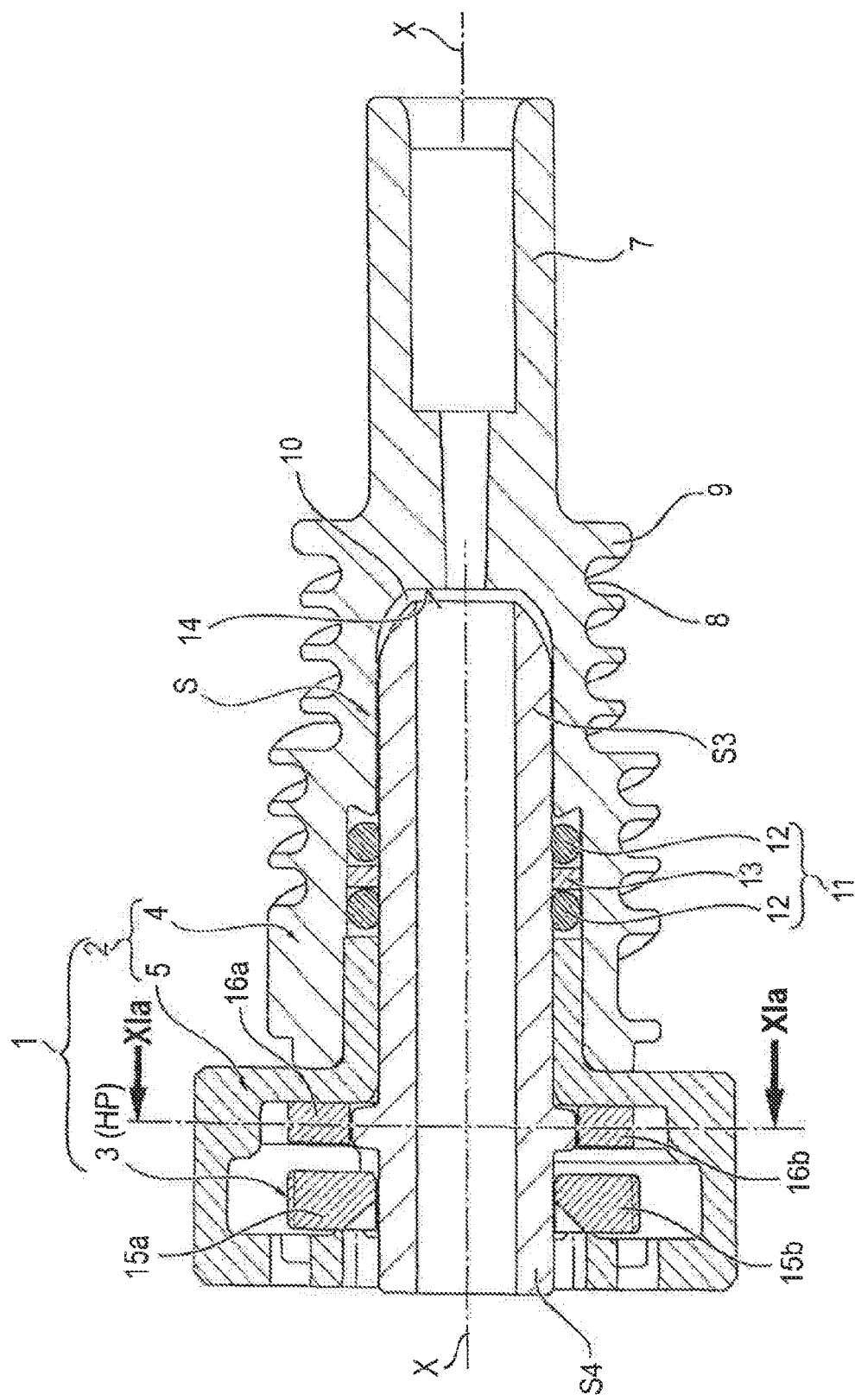
Figure 11C:
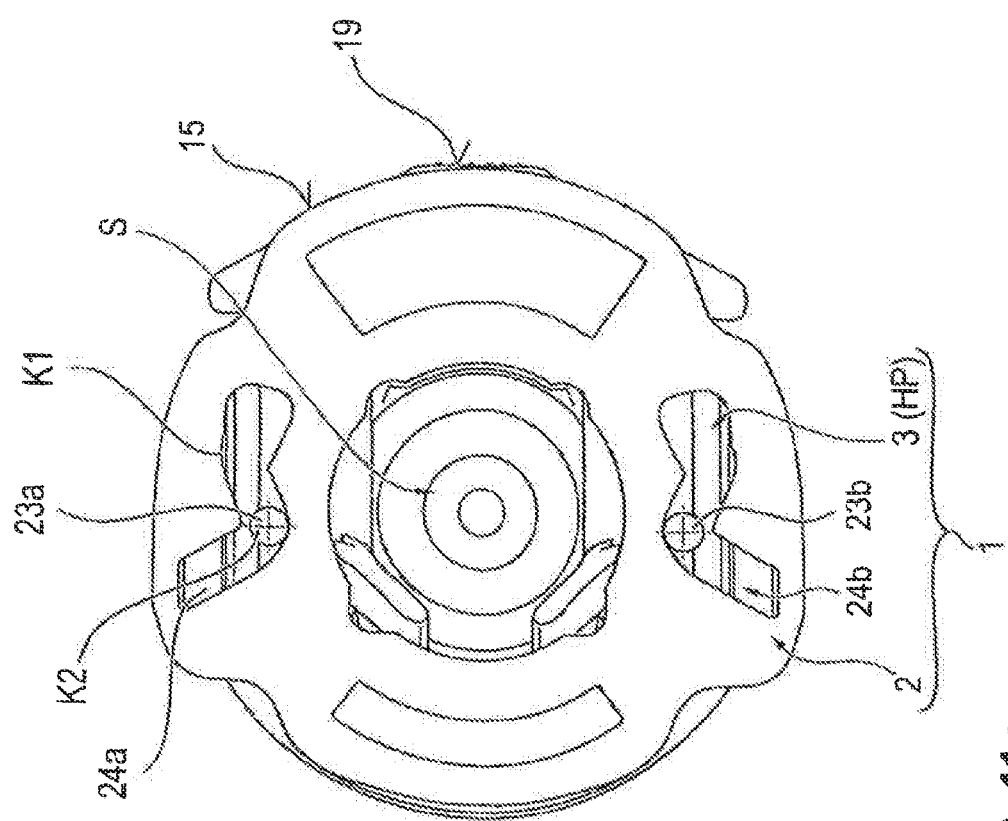

The retaining clip 3 is pre-assemblable on the coupling part 2 as a result of latching and, after insertion in the assembly direction M, assumes the insertion position EP for the plug part S shown in FIGS. 8a, 8b and FIG. 9. It can preferably comprise a clearance for a radial movement in the pre-assembly position. The retaining position HP of the retaining clip 3 for the plug part S is shown in FIGS. 11a to 11c and in FIG. 12 and in FIG. 13 (for a second embodiment of the plug-type connector 1 according to the invention). As can be seen by comparing the figures, the pre-assembly position and the assembly position of the retaining clip 3 in the plug-type connector 1 according to the invention coincide in an advantageous manner, i.e. the retaining clip 3 is aligned coaxially with respect to the axis of the coupling part in both positions—insertion position EP and retaining position HP for the plug parts—and is situated at the identical point in each case in the coupling part 2. In the insertion position EP, the plug part S is insertable into the receiving opening 10 through the retaining clip 3, and in the retaining position HP the plugged-in plug part S with its collar S2 is blockable in a positive locking manner in the receiving opening 10 by means of the retaining clip 3 against being pulled out.

The inner periphery of the receiving opening 10 of the coupling part 2 is advantageously realized in such a manner that, with the plug part S totally and correctly plugged into the receiving opening 10 (FIGS. 11a to 11c, FIG. 12, FIG. 13), the coupling part 2 forms a sealing connection to the plug part S. The sealing package 11 serves, in this case, for total sealing. The receiving opening 10 is delimited at its rear end in the plug-in direction SR in the basic body 4 by a ring wall 14 which forms a through-opening for the fluid.

It is provided according to the invention that the retaining clip 3 is held locked in a captive manner in the coupling part (2) both in the pre-assembly position (insertion position EP) and in the assembly position (retaining position HP), the retaining clip 3 closing off flush in an almost protrusion-free manner with the outer periphery 15 of the coupling part 2. The manner in which the locking is effected in this case in each of the two positions EP, HP is described in more detail below.

First of all, a preferred embodiment of a retaining clip 3 for a plug-type connector 1 according to the invention is described below by way of the three-dimensional representation in FIG. 3.

The retaining clip 3 can be realized preferably—as shown—in one piece, in particular as an injection molded part consisting of plastics material.

The retaining clip 3 is realized, in this case in particular,—when viewed in the direction of the longitudinal axis X-X of the plug-type connector 1—in a U-shaped manner in its basic shape, the legs of the U realizing two pairs 15a/15b, 16a/16b of spring arms 15a, 15b, 16a, 16b which are situated diametrically opposite one another. The spring arms 15a, 15b, 16a, 16b form resiliently elastic regions of the retaining clip 3. The legs of the U, in this case, are separated by a radial slot 17.

The pairs 15a/15b, 16a/16b of spring arms 15a, 15b, 16a, 16b are arranged one behind the other in the axial direction X-X and are also separated from one another by a slot 18, however an axial slot 18. The retaining clip 3, in this case, is realized symmetrically with regard to a longitudinal axis Y-Y which extends through it.

An actuating surface 20 for the retaining clip 3, by means of which the retaining clip 3 can be manually inserted radially (arrow M in FIGS. 5a, 6a, 7a) into the coupling part 2 for pre-assembly (FIGS. 5a/5b to FIGS. 8a/8b), is realized on the side remote from the free ends of the spring arms 15a, 15b, 16a, 16b by means of the connecting region 19 of the legs of the U, which can provide a rigid region of the at least regionally resiliently elastic retaining clip 3.

The front pair 15a/15b, which faces the plug-in direction SR of the plug part 1 in the axial direction X-X, serves predominantly for fulfilling the main function of producing the connection, therefore holds the latching arms 15a, 15b ready for the radial latching of the plug part 1, whilst the rear pair 16a/16b, which faces away from the plug-in direction SR of the plug part S in the axial direction X-X, serves for fulfilling the secondary function according to the invention of locking the retaining clip 3 in its insertion position EP and in its retaining position HP. The locking is illustrated, in particular, by FIG. 11a. As a result, the retaining clip 3 is held in a captive manner in the coupling part 2 both in the pre-assembly position and in the assembly position.

Figure 14:
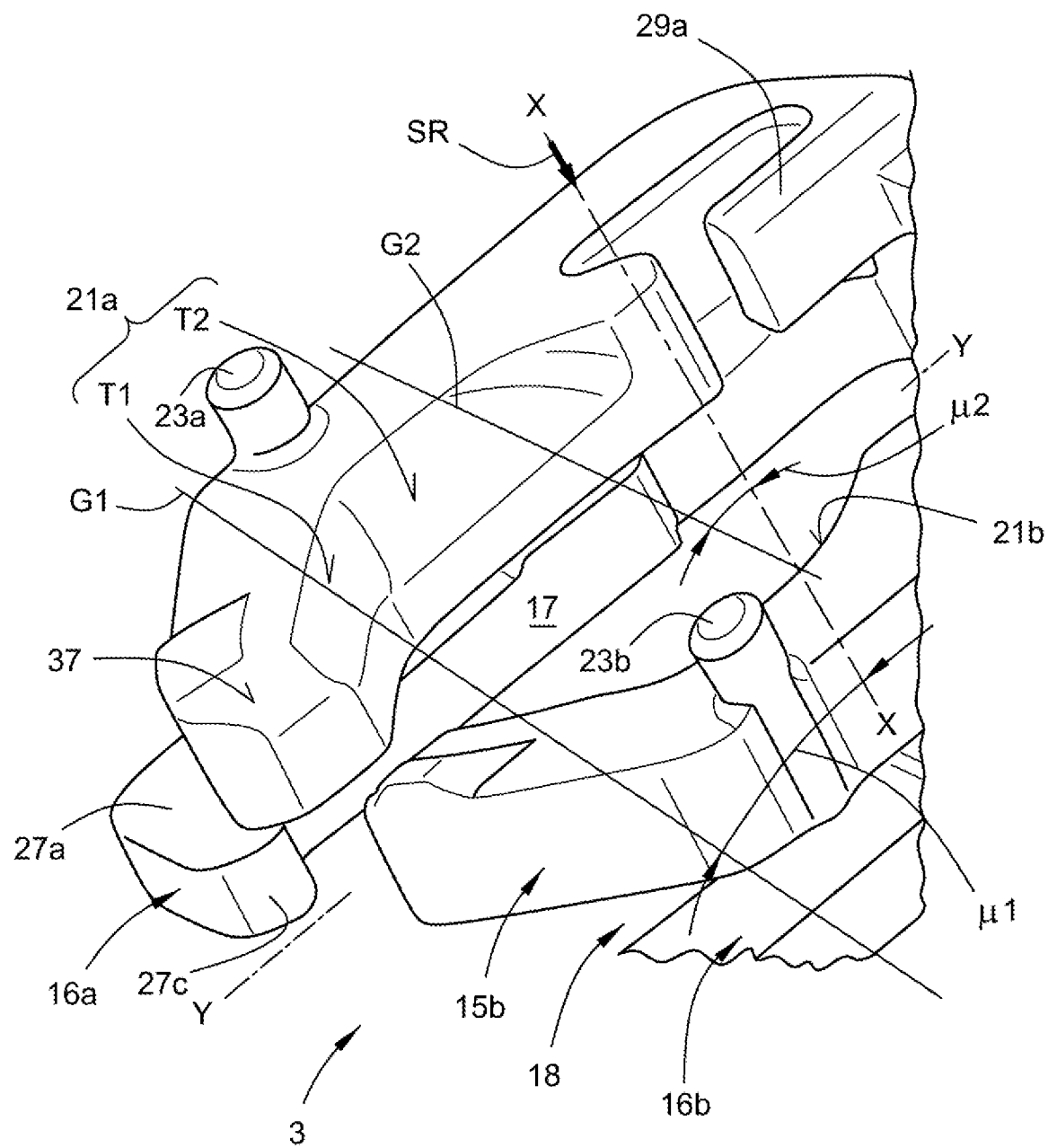
FIG. 14 shows a representation as in FIG. 3 of an enlarged view of half of a realization of a retaining clip for the embodiment shown in FIG. 1 of a plug-type connector according to the invention.

Inclined surfaces 21a, 21b, which diverge in opposition to the plug-in direction SR of the plug part S for interaction with the collar S2 of the plug part S, are situated on each of the spring arms 15a, 15b of the front pair 15a/15b, in particular at least in a central region of the spring arms 15a, 15b. The inclined surfaces 21a, 21b are advantageously each formed in each case by at least two part-surfaces T1, T2 which diverge at various angles µ1, µ2 in opposition to the insertion direction SR of the plug part S. The legs of the angles µ1, µ2 are formed, in this case,—as illustrated in FIG. 3 and also FIG. 14 in an enlarged representation and in FIGS. 15a to 15c, in particular the sectional representations in FIGS. 15b and 15c—on the one hand in each case by the longitudinal axis X-X of the plug-type connector 1 and, on the other hand, by a straight line G1, G2 through the respective center following the inclination of the surface T1, T2. The realization is identical for both inclined surfaces 21a, 21b, therefore also applies to the inclined surface 21b which can only be seen in outline in FIG. 3 and FIG. 14 on account of the perspective representation. FIG. 15b and FIG. 15c also each show the complementary angles 90°−µ1 and 90°-µ2 which enclose the straight lines with the planar clip surface. The angles are specifically at 55° for 90°-µ1 and at 40° for 90°-µ2 or the angle µ1 is equal to 35°, and the angle µ2 is equal to 50°. They differ from one another therefore by 15°.

The method of operation of the part-surfaces T1, T2 is explained in more detail below with reference to FIGS. 10a to 10c, in which the part-surfaces T1, T2 can also be found.

Furthermore, it is provided that guide pins 23a, 23b for engagement in complementary guide slots 24a, 24b of the coupling part 2 are situated on each of the spring arms 15a, 15b of the front pair 15a/15b of spring arms 15a, 15b, in particular in a central region of the spring arms 15a, 15b.

Figure 3:
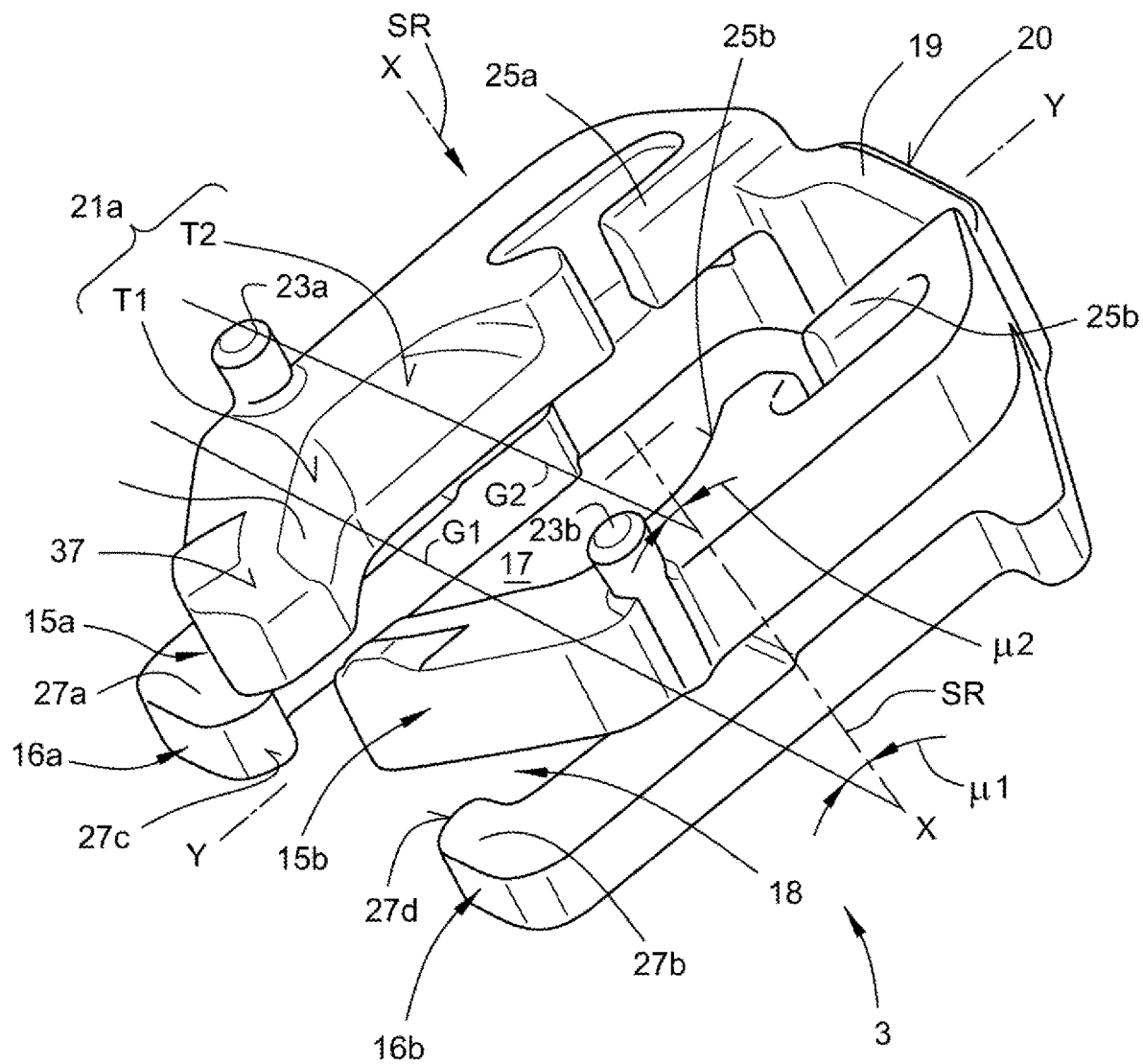
FIG. 3 shows a three-dimensional representation of an embodiment of a retaining clip for the embodiment shown in FIG. 1 of a plug-type connector according to the invention.
Figure 4A:
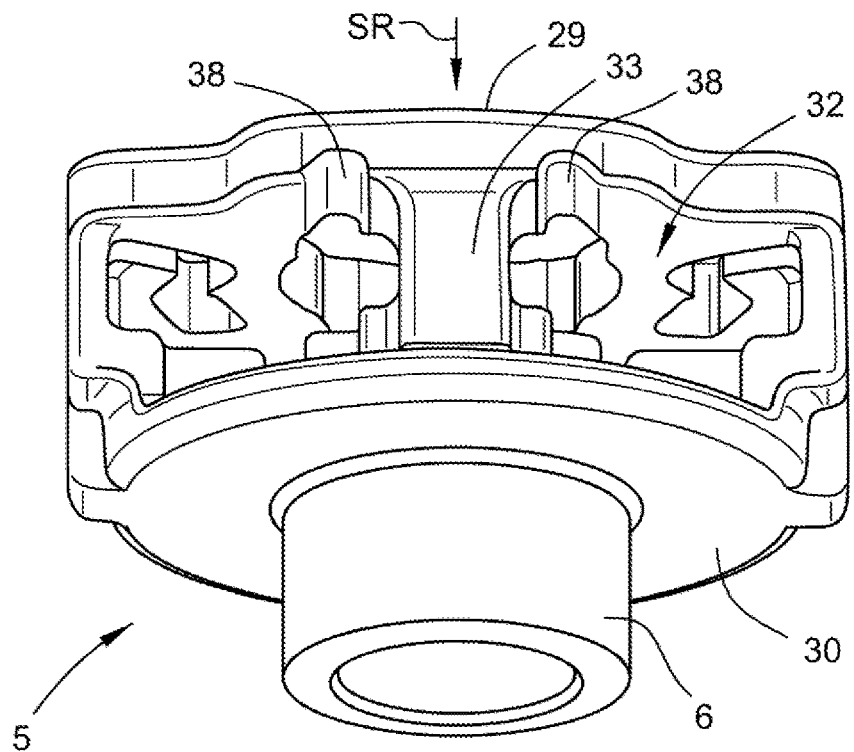
FIGS. 4a and 4b show, from various viewing angles, two three-dimensional representations of a receiving body of a coupling part for a retaining clip of the embodiment shown in FIG. 1 of a plug-type connector according to the invention, FIGS. 5a/5b, 6a/6b, 7a/7b, 8a/8b show in each case a front view and a side view of a sequence of figures of the pre-assembly of an embodiment of a plug-type connector according to the invention.
Figure 4B:
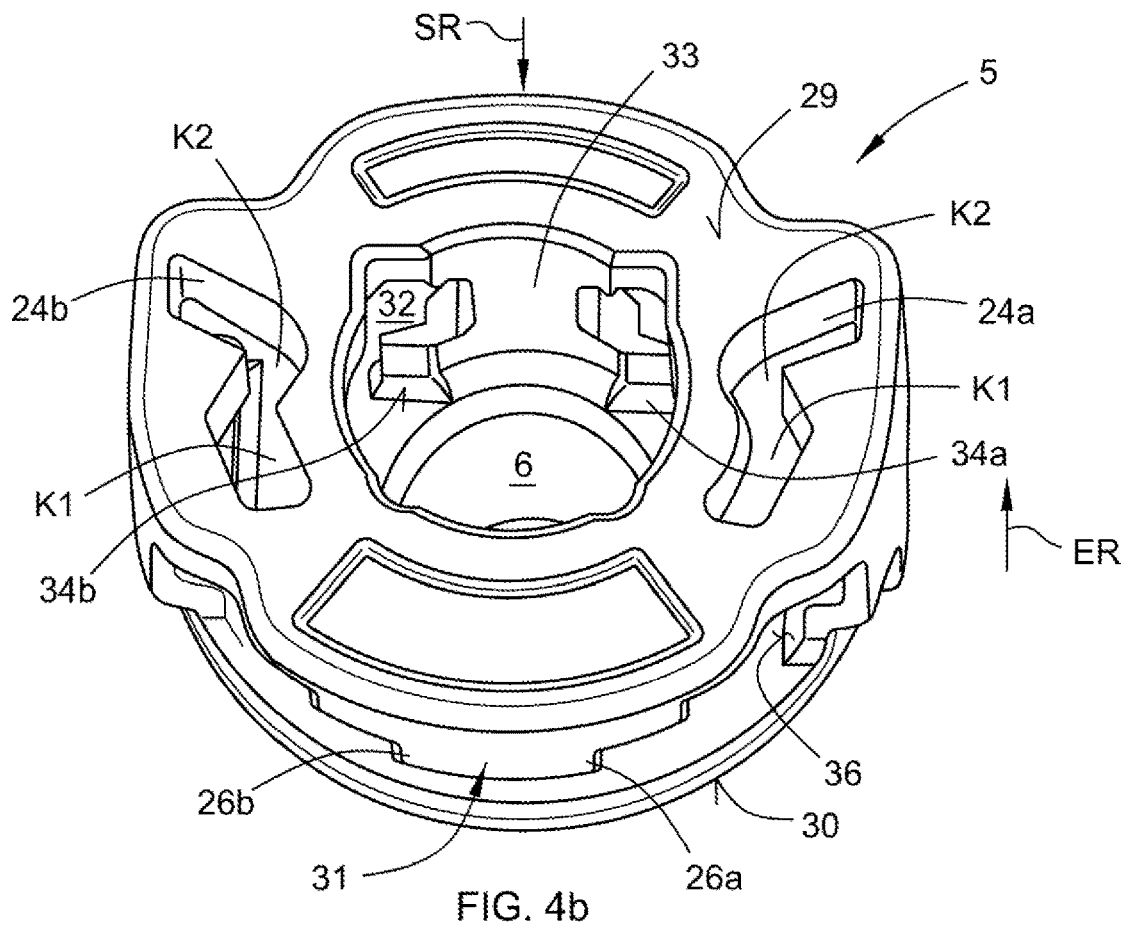
Figure 5A:
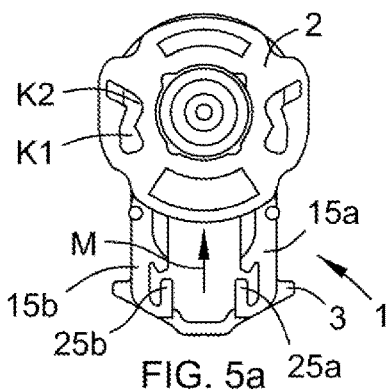
Figure 6A:
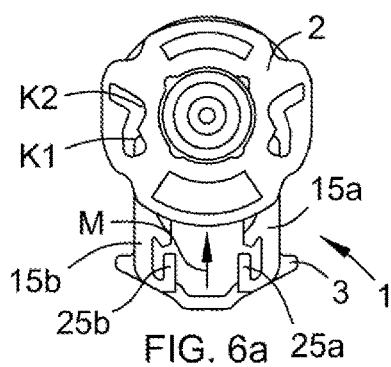
Figure 7A:
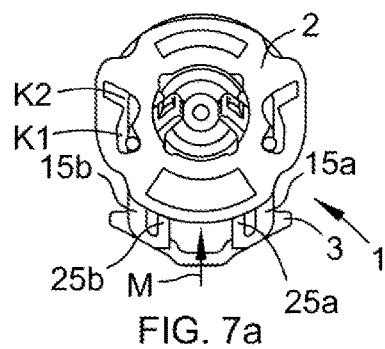
Figure 7B:
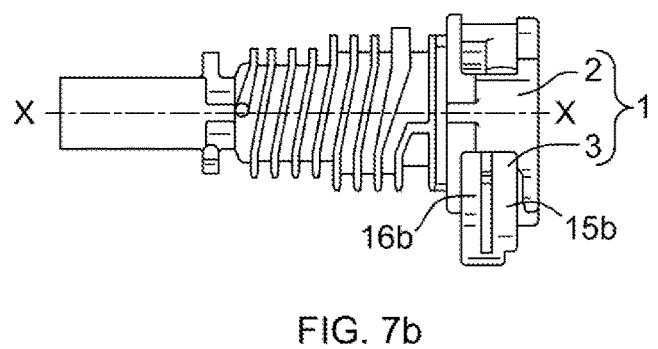

It can additionally be seen in particular in FIG. 3 as well as in FIGS. 5a, 6a and 7a that longitudinal guide webs 25a, 25b, which are directed in a secant-like manner to the coupling part, for interaction with complementary guides 26a, 26b of the coupling part 2 shown in FIG. 4b, are situated on each of the spring arms 15a, 15b of a front pair 15a/15b of spring arms 15a, 15b, in particular on both sides of the connecting region 19 or also in the connecting region 19 in which the spring arms 15a, 15b, 16a, 16b are connected together.

It is clear, furthermore, from FIGS. 1, 3 and 11a that cams 27a, 27b, with tips which are directed inward toward one another, are realized in each case on the free ends on the spring arms 16a, 16b of the rear pair 16a/16b of spring arms 16a, 16b which faces away from the insertion direction of the plug part S.

As the detailed representations of the receiving body 5 of the coupling part 2 illustrate in FIGS. 4a and 4b as an example, the coupling part 2, in particular by means of its receiving body 5 for the retaining clip 2, forms a housing for the retaining clip 3 which is hollow cylindrical in its basic shape and is closed at each of the respective end walls 29, 30 of the hollow cylinder. In this case, it comprises, on two sides which are situated diametrically opposite one another, peripheral openings 31, 32 for the through-passage of the retaining clip 3, in particular an insertion opening 31 (FIG. 4b) and an outlet opening 32 (FIG. 4a).

The already mentioned guide slots 24a, 24b can also be seen clearly in FIG. 4b. The guide slots 24a, 24b, for the engagement of complementary guide pins 23a, 23b which are located on the front spring arms 15a, 15b of the retaining clip 3, are situated in the coupling part 2, in particular in the receiving body 5 thereof for the retaining clip 3, on the end wall 29 of the coupling part 2 facing the insertion direction of the plug part S. The guide slots 24a, 24b are in each case elongated holes with two bend angles K1, K2. Their form can also be characterized by the form of a stylized lightning flash.

As a result, a control contour is realized in each case in the guide slots 24a, 24b, by means of which control contour, interacting with the complementary guide pins 23a, 23b, on the one hand, an insertion movement and an extension movement of the retaining clip 3 transversely to the plug-in direction SR of the plug part S is delimited, and on the other hand, in the case of a movement of the retaining clip 3 transversely to the plug-in direction SR of the plug part S, the spring arms 15a, 15b, on which the guide pins 23a, 23b are situated, are caused to move radially outward or radially inward.

Figure 6B:
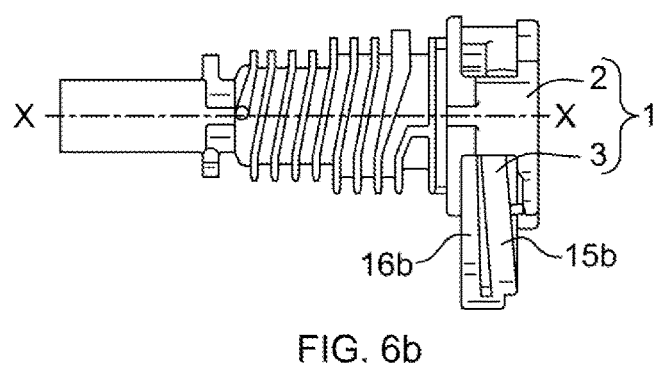

The already mentioned guides 26a, 26b, which are situated in the coupling part 2, in particular in the receiving body 5 thereof for the retaining clip 3, in particular on the inside of the end wall 29 of the coupling part 2 facing the insertion direction SR of the plug part S, for the complementary guide webs 25a, 25b or guide steps located on the spring arms 15a, 15b of the retaining clip 3, can also be found in FIG. 6b.

Furthermore, the two FIGS. 4a and 4b show that a blocking element 33, with in each case a counter contour 34a, 34b for the abutment of the cams 27a, 27b arranged at the ends of the spring arms 16a, 16b, is situated in the coupling part 2, in particular in the center of the region of the outlet opening 32 of the receiving body 5 of the coupling part 2, the cams 27a, 27b and the counter contours 34a, 34b representing releasable blocking means for the rear spring arms 16a, 16b of the retaining clip 3, insofar as they are able to realize a non-positive and a positive locking connection between the retaining clip 3 and the coupling part 2, as shown in FIG. 11a.

For assembling the plug-type connector 1 according to the invention, first of all according to FIG. 1, the sealing package 11 and then the receiving body 5 is inserted into the basic body 4 of the coupling part 2. Then the basic body 4 and the receiving body 5 are connected together in particular in a substance-to-substance bond—e.g. by means of laser welding.

Figure 5B:
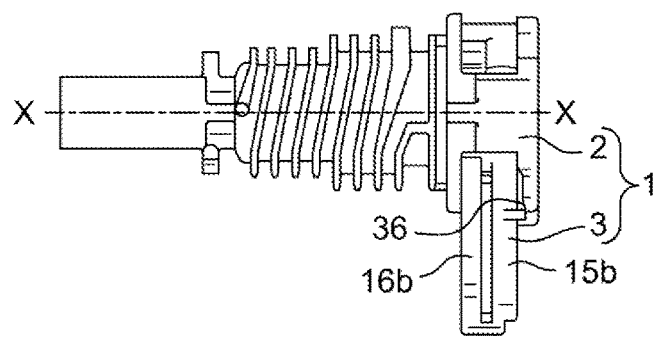

The retaining clip 3 is then inserted into the coupling part 2 according to the figure sequence 5a/5b to 8a/8b such that the pre-assembly state EP shown in FIGS. 8a/8b and 9 is created. The retaining clip 3 is first of all guided transversely to the plug-in direction SR of the plug part S through the insertion opening 31, which can be facilitated by lead-in chamfers 36 on the coupling part 2 (FIGS. 4b, 5b, 6b). For the insertion of the retaining clip 3, the spring arm pairs 15a/15b, 16a/16b thereof are then pressed axially toward one another, which, in turn, is made possible by the slot 18. This is shown in FIGS. 6a/6b. Jamming or tilting of the retaining clip 3 in the coupling part 2 is advantageously ruled out in this case.

The spring arm pairs 15a/15b, 16a/16b are then relieved of pressure such that guide pins 23a, 23b of the front spring arms 15a, 15b engage in the complementary guide slots 24a, 24b of the coupling part 2 (FIGS. 7a/7b). The guide pins 23a, 23b of the spring arms 15a, 15b, in this case, slot in the ends of the guide slots 24a, 24b such that a return movement of the retaining clip 3 is blocked.

In order to arrive at the final take-up of the pre-assembly position EP, the retaining clip 2 has, however, to be moved further radially in its insertion direction M, the longitudinal guide webs 25a, 25b acting in a stabilizing manner. In the case of the further movement, the cams 27a, 27b of the rear spring arms 16a, 16b are urged apart from one another by means of inclined surfaces 27c, 27d (FIG. 3, FIG. 11a) which are situated thereon and converge inwards in each case as a result of interaction with the counter contours 34a, 34b of the blocking element 33 when they bear against them, pass the counter contours 34a, 34b and finally engage behind them, as shown in FIG. 11a. FIG. 11a does relate to the final assembly position HP, but the fixing is identical in the final assembly position HP and in the pre-assembly position EP of the retaining clip. The retaining clip 3 is consequently situated in the insertion position EP, it being held in a locked manner. As can be seen in particular in FIGS. 8a and 9, the guide pins 23a, 23b of the spring arms 15a, 15b are situated, in this case, in the guide slots 24a, 24b in the region of the second bend angles K2. A plug-type connector 1 according to the invention can be delivered in the state.

Figure 10B:
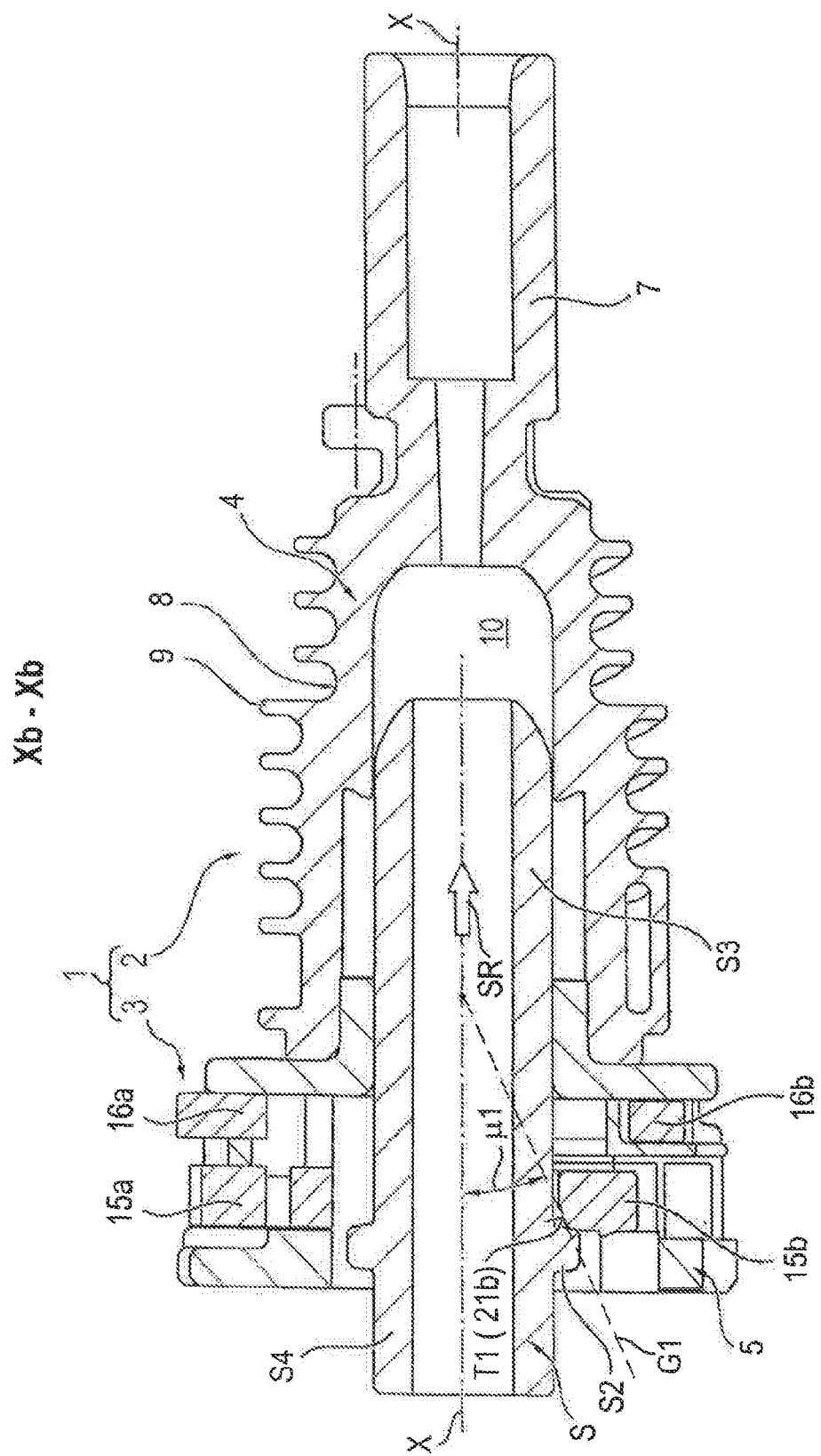
FIGS. 10b and 10c show two axial sections of the plug-type connector according to the invention shown in FIG. 10a (without a sealing package) at the start of the assembly corresponding to the cutting planes Xb-Xb and Xc-Xc.
Figure 10C:
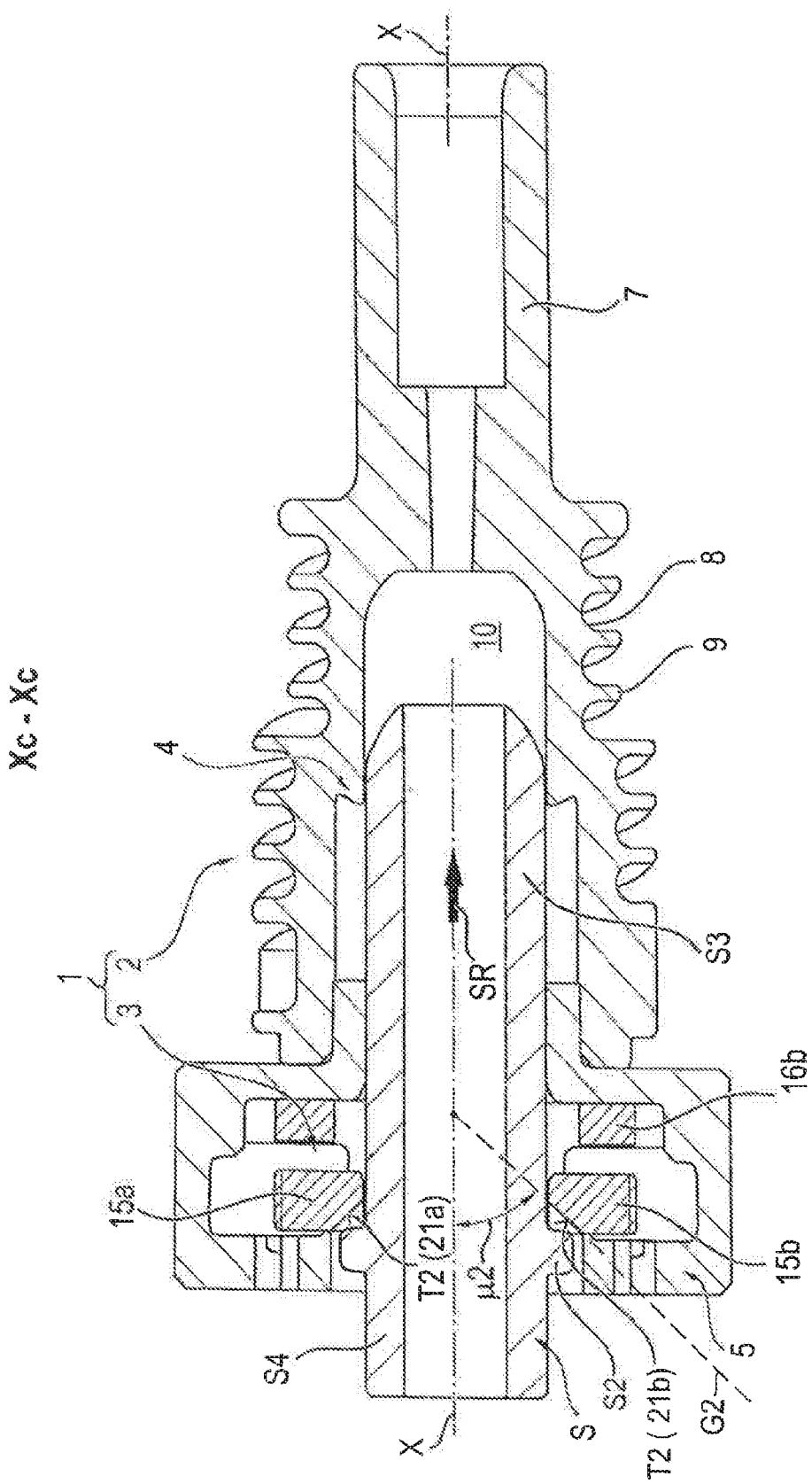

FIGS. 10a, 10b and 10c—as already mentioned—show an intermediate state between the pre-assembly state, in particular according to FIG. 9, and the final assembly state, in particular according to FIGS. 11a to 11c and FIG. 12, of a plug-type connector 1 according to the invention. FIGS. 10a, 10b and 10c show, in particular, a state at the start of the plugging-in process, whilst FIGS. 11a, 11b and 11c show the state once the plug-in position of the plug part 1 has been reached.

A comparison of figures between FIG. 10b and FIG. 10c, which show the two different axial sections of the plug-type connector 1 according to the invention according to FIG. 10a corresponding to the cutting planes Xb-Xb and Xc-Xc, illustrates the method of operation of the already mentioned part-inclined surfaces T1, T2. As shown in FIG. 10b, the retaining collar S2 of the plug part S initially contacts the first part-inclined surface T1 when it is inserted into the retaining clip 3, and then when the plug part S is moved further forward in the plug-in direction SR, there is ever increasing contact with the second part-inclined surface T2.

The first part-surface T1, which is arranged operationally upstream of the second part-surface T2 with regard to its interaction with the collar S2 of the plug part S, pulls the retaining clip 3 in radially before it is widened, insofar as the retaining clip 3 is able to comprise more clearance for a radial movement (FIG. 10b). The second part-surface T2, in this case, is still non-functional (FIG. 10c). This is achieved as a result of the first part-surface T1 being at a smaller angle µ1 to the central axis X-X of the plug-type connector 1 than the second part-surface T2. The second part-surface T2 is at a greater angle µ2 to the central axis X-X. The retaining clip being pulled in radially by the first part-surface T1 causes the guide pins 23a, 23b to be moved along on the inner guide surfaces of the guide slots 24a, 24b, and the retaining clip consequently to be already slightly widened. During further insertion following the first part-surface T1, the second part-surface T2 then becomes active and widens the retaining clip 3 radially until in its open position. The retaining clip 3 is widened by the collar S2, the spring arms 15a, 15b moving radially apart from one another such that the collar S2 of the plug part S is able to pass the first latching arm pair 15a/15b in the axial direction. The arms 15a, 15b are then finally able to latch in behind the collar S2. The effect of the further widening of the retaining clip 3 on the guide pins 23a, 23b is such that they are able, in particular, to lift off from the inner guide contour of the guide slots 24a, 24b and move along them until in an end position—this corresponds to the maximum widening of the retaining clip 3 by the collar S2. Once the retaining arms 15a, 15b have latched behind the collar S2, the sliding back of the guide pins 23a, 23b along the inner guide contour of the guide slots 24a, 24b supports the radial return movement of the retaining clip 3 into the insertion position. The guide pins 23a, 23b are then situated once again in the guide slots 24a, 24b in the position of the second bend angle K2.

In the case of a retaining clip 3 without part-surfaces T1, T2 which are configured in this manner, which can be designed, in particular, as chamfers, the guide cams 23a, 23b would only be urged radially outward and a collision could possibly occur with the outer boundaries of the guide contour of the guide slots 24a, 24b in the region of the second bend angle K2. This would result in an unwanted sudden increase in insertion forces and in the case of manual insertion consequently in an irritating jolt in the plug-in feeling for the fitter.

To release the plug-in connection, the retaining clip 3 is displaced further in the actuating direction M as a result of pressing onto its actuating surface 20. As a result, during the actuation the guide pins 23a, 23b are displaced radially outward (arrows Ö in FIGS. 12 and 13) out of the bend region K2 in the guide contour of the guide slots 24a, 24b up to a maximum of the end of the elongated hole. The spring arms 15a, 15b are consequently widened such that the plug part collar S2 is released again as a result of the widening of the spring arms 15a, 15b. The connection can now be released by the plug part S being pulled out of the plug-type connector 1.

Once the retaining clip 3 is then released after disassembly, it slides—on account of the resetting force set by the previously effected widening process—back into a position in which the guide pins 23a, 23b are situated in the region of the second bend angle K2, the retaining clip 3, however, not protruding from the coupling part 2.

Figure 12:
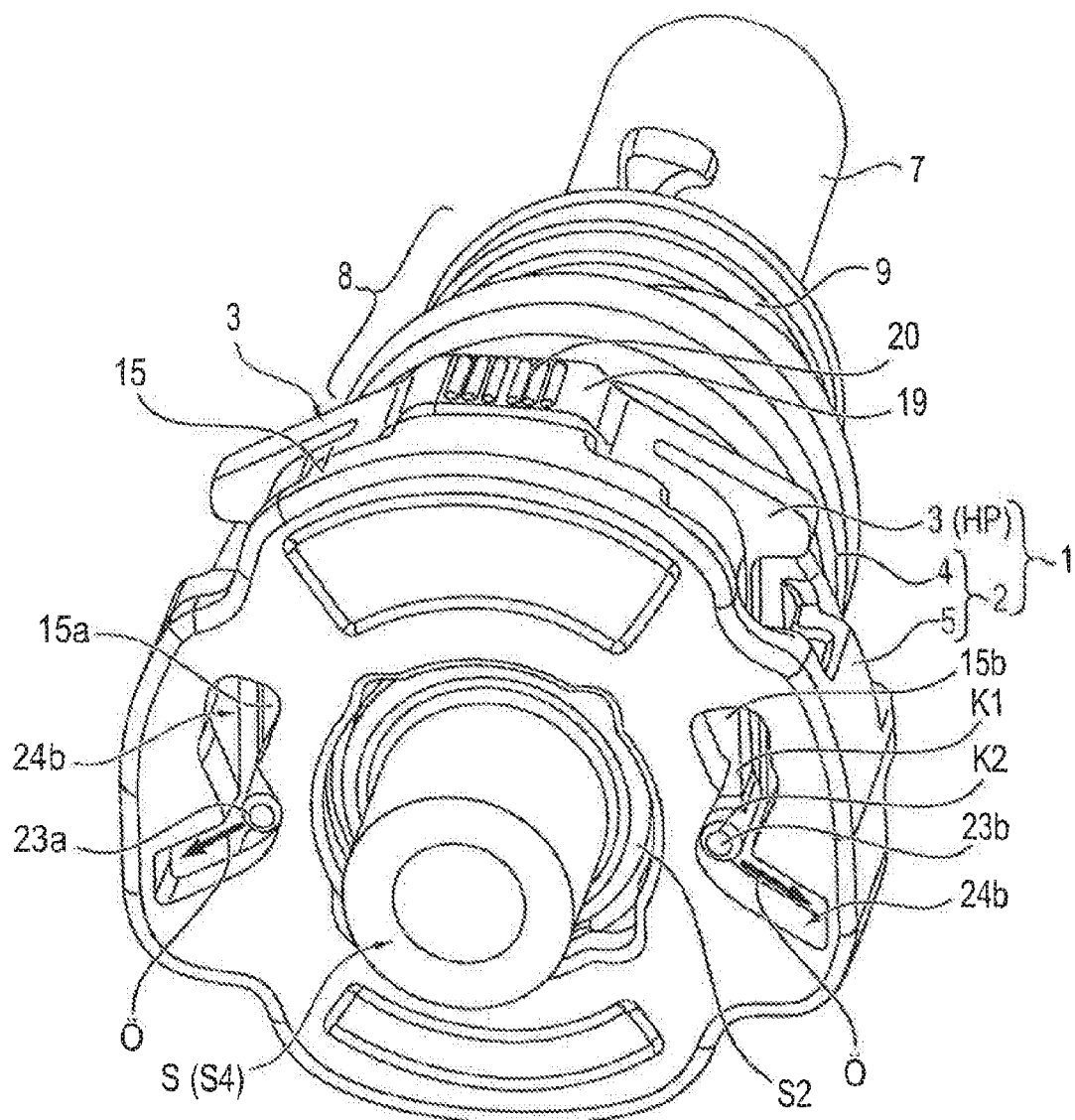
FIG. 12 shows a three-dimensional representation of the embodiment shown in FIGS. 11a to 11c of a plug-type connector according to the invention with a plug part inserted, but not yet in the final assembly state.
Figure 13:
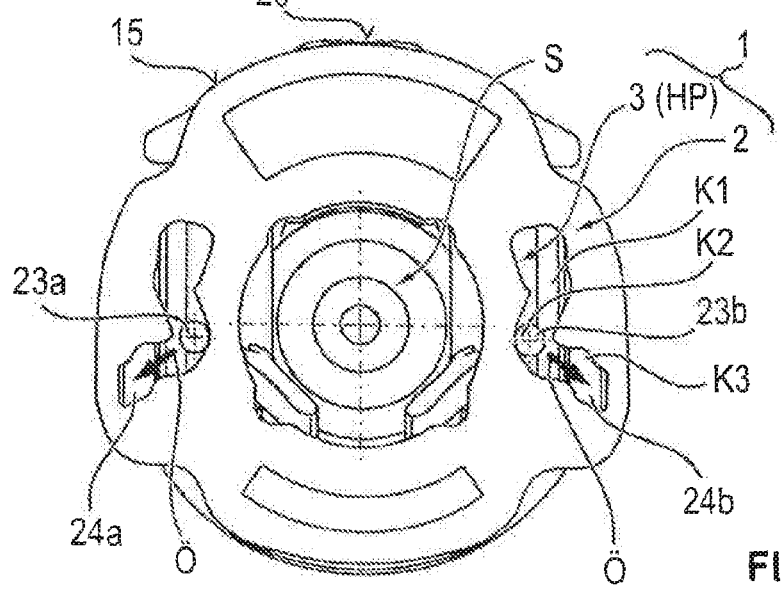
FIG. 13 shows a view of the end face of a further embodiment of a plug-type connector according to the invention, in a final assembly state with the plug part inserted.

As is shown particularly clearly, for example, in FIGS. 9, 12 and 13, the guide slots 24a, 24b of the coupling part 2 initially extend radially outward in a first portion, then radially inward in a second portion and then in a third portion finally radially outward again on account of the two bend points K1, K2.

As the spring arms 15a, 15b are pressed together in the axial direction during pre-assembly (FIG. 6b), the first and the second portions of the guide slots 24a, 24b, however, only play a secondary role during installation according to FIGS. 5a/5b to 8a/8b, it could certainly be possible to dispense with them completely as a breakthrough, they then being closed as an alternative, but in an expedient manner guide grooves could be provided for the guide pins 23a, 23b in the portions on the inside of the wall 29.

The further embodiment of a plug-type connector 1 according to the invention shown in FIG. 13, which shows the final assembly state HP with the plug part S inserted, differs from the first embodiment in that there are three bend points K1, K2, K3 present in the guide slots 24a, 24b of the coupling part 2. The third bend point K3 is situated, in this case, in the respective third portion of the guide slots 24a, 24b which controls the opening movement of the retaining clip 3 and leads radially outward. The third bend point K3, as the guide pins 23a, 23b encounter an additional elevation in their path at this point, provides a resistance against the opening movement and can be localized advantageously in such a manner that precisely when the retaining clip 3 is opened sufficiently for the removal of the plug part S, there is an increase in force, where applicable linked to a click. In particular in the case of small nominal sizes where the actuating surfaces 20 are also small, the state of the release operation is more easily recognizable to the fitter as he obtains a haptic or additionally also an acoustic signal and consequently does not attempt to pull on the plug part S or on a line connected thereto prematurely in order to release the plug-in connection.

Furthermore, the plug-type connector 1 according to the invention can additionally include in an advantageous configuration a pressure locking system which prevents, in particular, the system, that is to say the plug-in connection in the assembled state when the plug part S is plugged-in and is under pressure, from being able to be opened. As a result, it is also possible to rule out the damaging effect of tensile forces acting on the plug part S in the axial direction X-X. In a preferred realization, such a pressure locking system is realized as a result of chamfered elevations 37 (only shown in FIG. 3), which protrude in opposition to the plug-in direction SR in the axial direction X-X, being situated on the front spring arms 15a, 15b, in particular on the free ends thereof, to which in each case a counter contour 38 in the receiving body 5 of the retaining clip 3 corresponds in a complementary manner (only shown in FIG. 4a). The counter contours 38, in this case, are indentations into which the elevations 37 engage in a positive locking manner.

The invention is not restricted to the exemplary embodiments shown and described, but also includes all realizations having the same effect in terms of the invention. Thus, the part-surfaces T1, T2 of the inclined surfaces 21a, 21b are in each case planar surfaces in the exemplary embodiments shown, they could, however, also be designed in each case as truncated cone shell surfaces or as freeform surfaces. In the representation shown in FIG. 15a, they are, in particular, at an angle µ3 with respect to one another, which can preferably be 135°±15°.

The difference µ2-µ1 between the angles µ2, µ1 can preferably be within the range of between 10° and 20° in a general realization. The angles µ2, µ1 themselves can generally preferably assume values within the range of 35°±5° for the angle μ1 and values within the range of 50°±10°, in particular 50°±7°, for the angle μ2.

t is expressly emphasized that the exemplary embodiments are not restricted to all the features in combination, rather each individual part-feature, even separated from all the other part-features, can have inventive significance per se.

In addition, the invention is also hitherto not restricted to the feature combination defined in claim 1 but can also be defined by any arbitrary other combination of certain features of all the individual features disclosed in total. This means that, in principle, practically any individual feature of claim 1 can be omitted or replaced by at least one individual feature that is disclosed at another position in the application.

The invention claimed is:

1. A plug-type connector, for hose and/or pipe connections, including a plug part with a plug shaft having a collar, the plug-type connector comprising:
a coupling part having a receiving opening defining a central longitudinal axis and into which the plug part is insertable in a plug-in direction along the longitudinal axis, and
a radially slotted retaining clip that is resiliently elastic in regions and includes at least two spring arms, the retaining clip having a pre-assembly position on the coupling part that assumes an insertion position for the plug part in which the plug part is insertable through the retaining clip into the receiving opening, and the retaining clip having an assembly position on the coupling part that assumes a retaining position for the inserted plug part in which the plug part with its collar is blocked in the receiving opening in a positive locking manner by the retaining clip against being pulled out of the receiving opening,
wherein the basic shape of the retaining clip, when viewed in a direction of the longitudinal axis is a U-shape with legs realized as two pairs of diametrically opposed spring arms arranged one behind the other in the longitudinal direction, the two pairs of spring arms are longitudinally separated from one another by a slot and are resiliently elastic in both a radial direction and the longitudinal direction, wherein a first pair of the spring arms blocks in the plug part in the retaining position in a positive locking manner against being pulled out of the receiving opening and a second pair of the spring arms holds the retaining clip in a captive manner in the coupling part both in the pre-assembly position and in the assembly position;
the first pair of the spring arms being located on a side of the retaining clip that faces the plug-in direction of the plug part when the retaining clip is in the insertion position and in the retaining position, each spring arm of the first pair of spring arms including an inclined surface, wherein the inclined surfaces separate in opposition to the plug part being moved in the plug-in direction for interaction with the collar of the plug part, the inclined surfaces in each case being arranged on a side of the spring arms that faces the plug-in direction of the plug part, the inclined surfaces each being formed as at least two part-surfaces each of which defines a divergence angle relative to the longitudinal axis and facing in opposition to the plug-in direction of the plug part, in each case a first part-surface of the inclined surface is situated in the vicinity of a free end of the spring arm and includes a first divergence angle and a second part-surface of the inclined surface is arranged in a central region of the spring arm and includes a second divergence angle, the first divergence angle being smaller than the second divergence angle;
wherein differences between the divergence angles is within the range of between 10° and 20°; and
wherein guide pins for engagement in complementary guide slots of the coupling part are provided on each of the spring arms that face an end wall of the coupling part, that faces the plug-in direction of the plug part the guide pins each being located in a central region of the spring arms.

2. The plug-type connector as claimed in claim 1, wherein the pre-assembly position and the assembly position of the retaining clip are aligned coaxially with respect to one another and to the longitudinal axis of the coupling part, wherein the retaining clip in the pre-assembly position comprises a clearance for a radial movement.

3. The plug-type connector as claimed in claim 1, wherein the retaining clip is a one piece injection molded part produced from plastics material.

4. The plug-type connector as claimed in claim 1, wherein an actuating surface of the retaining clip is formed as a connecting region between the spring arms on a side of the spring arms located away from the free ends of the spring arms.

5. The plug-type connector as claimed in claim 1, wherein longitudinal guide webs are provided on each of the spring arms that face an end wall of the coupling part that faces the plug-in direction of the plug part, the longitudinal webs being directed in a secant manner to the coupling part and interact with complementary guides provided on the coupling part.

6. The plug-type connector as claimed in claim 5, wherein the longitudinal guide webs are arranged on both sides of a connecting region where the spring arms are connected together.

7. The plug-type connector as claimed in claim 5, wherein the longitudinal guide webs are each arranged on radially inwardly directed projections of the spring arms.

8. The plug-type connector as claimed in claim 1, wherein cams with tips directed inwardly toward one another are provided on each on the spring arms that face away from an end wall of the coupling part that faces the plug-in direction of the plug part.

9. The plug-type connector as claimed in claim 1, wherein the coupling part includes a sleeve part and a receiving body in a ring shape for the retaining clip, the sleeve part and the receiving body being connected together are connected together in an assembled state, wherein one of the sleeve part and the receiving body are realized as an injection molded part formed of a plastic material.

10. The plug-type connector as claimed in claim 9, wherein a sealing package is provided in the sleeve part of the coupling part, the sealing package including two sealing rings and a spacer ring arranged there between.

11. The plug-type connector as claimed in claim 9, wherein the receiving body forms a housing having hollow cylindrical shape closed in each case at respective end walls of the hollow cylindrical shape, an insertion opening and an outlet opening are provided on opposite sides of the housing for the through-passage of the retaining clip.

12. The plug-type connector as claimed in claim 1, wherein the guide slots are situated in a receiving body of the coupling part that is configured to receive the retaining clip.

13. The plug-type connector as claimed in claim 12, wherein each of the guide slots includes a control contour, the control contour and the guide pins cooperating to delimit insertion movement and extension movement of the retaining clip transversely to the plug-in direction of the plug part, and when the retaining clip is moved transversely to the plug-in direction of the plug part the control contour and the guide pins cooperating to cause the spring arms to move radially outward or radially inward.

14. The plug-type connector as claimed in claim 12, wherein a bend point is provided in a portion of the guide slots that leads radially outward and controls an opening movement of the retaining clip, the bend portion configured to cooperate with the guide pins and increase a force acting on an actuating surface that is to be expended for opening of the retaining clip, and the bend portion and guide portions additionally configured to create an acoustic signal.

15. The plug-type connector as claimed in claim 9, wherein on an inside of the end wall of the receiving body there are provided guides that interact with complementary guide webs provided on the spring arms.

16. The plug-type connector as claimed in claim 11, wherein a blocking element, with a counter contour for interaction with cams provided at ends of the spring arms, is provided in a middle region of the outlet opening of the coupling part, wherein the cams and the blocking element define a positive locking and non-positive locking connection between the retaining clip and the coupling part.

17. The plug-type connector as claimed in claim 1, wherein chamfered elevations protrude in the longitudinal direction in opposition to the plug-in direction and are provided on free ends of each of the spring arms that face an end wall of the coupling part that faces the plug-in direction of the plug part, wherein a complementary counter contour to each of the chamfered elevations is defined in the retaining clip as an indentation.

18. The plug-type connector as claimed in claim 1, wherein the legs of the divergence angles are in a common plane and formed on the one hand in each case by the longitudinal axis of the plug-type connector and, on the other hand, in each case by a straight line following the inclination of the inclined surface through respective centers of the part-surfaces.

* * * * *